United States Patent
Vokes et al.

(10) Patent No.: US 11,023,893 B2
(45) Date of Patent: Jun. 1, 2021

(54) IDENTITY VALIDATION

(71) Applicant: Worldpay Limited, London (GB)

(72) Inventors: Jonathan Vokes, London (GB); Nicholas Telford-Reed, London (GB)

(73) Assignee: Worldpay Limited, London (GB)

( * ) Notice: Subject to any disclaimer, the term of this patent is extended or adjusted under 35 U.S.C. 154(b) by 246 days.

(21) Appl. No.: 15/735,160

(22) PCT Filed: Aug. 18, 2016

(86) PCT No.: PCT/GB2016/052554
§ 371 (c)(1),
(2) Date: Dec. 8, 2017

(87) PCT Pub. No.: WO2017/029503
PCT Pub. Date: Feb. 23, 2017

(65) Prior Publication Data
US 2018/0300724 A1    Oct. 18, 2018

(30) Foreign Application Priority Data

Aug. 18, 2015  (GB) .................................... 1514657

(51) Int. Cl.
*G06Q 20/40*   (2012.01)
*G06Q 20/32*   (2012.01)
(Continued)

(52) U.S. Cl.
CPC ......... *G06Q 20/4014* (2013.01); *G06Q 10/00* (2013.01); *G06Q 20/32* (2013.01);
(Continued)

(58) Field of Classification Search
CPC ................................................ G06Q 20/4014
See application file for complete search history.

(56) References Cited

U.S. PATENT DOCUMENTS 4,562,341 A * 12/1985 Ohmae ............... G06Q 20/4037
                                                     235/379
8,175,979 B2 * 5/2012 Baentsch ............... H04L 9/3271
                                                     705/67
(Continued)

FOREIGN PATENT DOCUMENTS

WO   WO2012040377 A1   3/2012
WO   WO2014184771 A1   11/2014
(Continued)

OTHER PUBLICATIONS

Perez; Sarah, Visa Launches Mobile Payments Provisioning Service; Teams Up With Vodafone, Feb. 27, 2020, TechCrunch, Mobile World Congress Feb. 27-Mar. 1, 2012, whole document. (Year: 2012).*

(Continued)

*Primary Examiner* — Hani M Kazimi
*Assistant Examiner* — Adam Hilmantel
(74) *Attorney, Agent, or Firm* — Bookoff McAndrews, PLLC

(57) ABSTRACT

The invention relates generally to the provisioning of payment instruments onto electronic devices such as a mobile telephone, tablet, laptop or wearable, and in particular to securely provisioning payment instrument for which authorization for the provisioning must be provided by a payment instrument issuer. A first embodiment is provided in which data that is generated during a transaction is received by an electronic device and transmitted from the electronic device to a server associated with an acquirer. The data received from the electronic device is compared to the data generated during the transaction and, if these match, provisioning is authorized. A second embodiment is provided in which a server associated with an acquirer generates an identification message that is separate from but based on a response message associated with a transaction, and provisioning is authorized or declined select module based on the identification message.

19 Claims, 9 Drawing Sheets

(51) Int. Cl.
*G06Q 10/00* (2012.01)
*G06Q 20/34* (2012.01)
*G06K 7/14* (2006.01)

(52) U.S. Cl.
CPC ..... *G06Q 20/3227* (2013.01); *G06Q 20/3229* (2013.01); *G06Q 20/3276* (2013.01); *G06Q 20/3278* (2013.01); *G06Q 20/341* (2013.01); *G06Q 20/409* (2013.01); *G06Q 20/4012* (2013.01); *G06Q 20/40145* (2013.01); *G06K 7/1413* (2013.01); *G06K 7/1417* (2013.01)

(56) References Cited

U.S. PATENT DOCUMENTS

| | | | | |
|---|---|---|---|---|
| 2007/0143230 | A1* | 6/2007 | Narainsamy | G06Q 20/40 705/75 |
| 2012/0088487 | A1* | 4/2012 | Khan | G06Q 20/322 455/418 |
| 2014/0114855 | A1* | 4/2014 | Bajaj | G06Q 20/4012 705/44 |
| 2014/0114857 | A1* | 4/2014 | Griggs | G06Q 40/00 705/44 |
| 2016/0078434 | A1* | 3/2016 | Huxham | G06Q 20/382 705/71 |
| 2016/0098700 | A1* | 4/2016 | Johnson | G06Q 20/3278 705/43 |

FOREIGN PATENT DOCUMENTS

| | | | | |
|---|---|---|---|---|
| WO | WO-2015144066 | A1 * | 10/2015 | ......... H04L 63/0428 |
| WO | WO2017029503 | A1 | 2/2017 | |

OTHER PUBLICATIONS

Foreign Communication from a Related Counterpart Application, International Search Report and Written Opinion dated Oct. 13, 2016, International Application No. PCT/GB2016/052554 filed on Aug. 18, 2016.

* cited by examiner

IDENTITY VALIDATION

CROSS-REFERENCE TO RELATED APPLICATIONS

The present application is a filing under 35 U.S.C. 371 as the National Stage of International Application No. PCT/GB2016/052554, filed Aug. 18, 2016, entitled "IDENTITY VALIDATION," which claims priority to Great Britain Application No. GB 1514657.4 filed with the Intellectual Property Office of Great Britain on Aug. 18, 2015 and entitled "Identity Validation," both of which are incorporated herein by reference in their entirety for all purposes.

FIELD OF INVENTION

This invention relates to payment instrument provisioning, and specifically to the authenticating of a request to provision a payment instrument onto an electronic device.

BACKGROUND

Many people routinely carry a portable electronic device (e.g. a smartphone) on their person that has the necessary hardware to communicate with a point of sale device. In view of this, it has been recognised that by virtualising a payment instrument (also known as 'Tokenisation'), a person can use their electronic device as a payment device without having to make use of a more traditional plastic payment card or other such payment instrument. So-called 'contactless' payment using smartphones, where a person brings their smartphone into proximity with a point of sale terminal or PIN Entry Device having Near Field Communication (NFC) capabilities to effect a payment, is an example of this.

A key part of the virtualisation process is the creation of the virtual payment instrument on the electronic device. The process of creating a virtual payment instrument is often referred to in the art as 'payment instrument provisioning', 'Instrument provisioning', 'card provisioning', or just simply 'provisioning'. In the provisioning process, a payment instrument is loaded onto an electronic device, such that a virtual equivalent of the payment instrument (the 'provisioned payment instrument) is created. Here the provisioned payment instrument may also include other provisioning elements, such as cryptographic keys, and other settings associated with the payment instrument. This allows the electronic device to be used to effect payments, both physically, e.g. at a point of sale in a store and electronically, e.g. online purchasing through apps stored on the electronic device. The provisioned payment instrument is stored securely on the electronic device, which may involve storing the provisioned payment instrument in a so-called 'Secure Element' provided on the device, as is known in the art. Alternatively the provisioned payment instrument (including cryptographic keys and settings, if present) can be stored in the so-called 'cloud' and not kept in its entirety on the electronic device. This is also known in the art.

As is known in the art of payment instrument provisioning systems, three provisioning 'paths' are defined. A first path defines a provisioning process for payment instruments that can be provisioned to an electronic device without the electronic device having to contact the instrument issuer for verification during the provisioning process. A second path defines a provisioning process for payment instruments that cannot be provisioned to an electronic device, such that there is no need to contact the instrument issuer for verification during the provisioning process. This path may contain blacklisted instruments, for example. A third path defines a provisioning process for payment instruments for which approval from an instrument issuer must be sought by the owner of the electronic device and payment instrument before the payment instrument can be provisioned to the device. The present invention is concerned with payment instrument that fall under this third path.

Typically, a user is required to enter various pieces of information associated with the payment instrument into the electronic device that the payment instrument is being provisioned onto. In the case where the payment instrument is a payment card of the type well known in the art, the information usually comprises the user's name, a unique identifier associated with the payment card (e.g. a Primary Account Number or 'PAN'), the expiry date of the payment card and the cardholder security code from the signature strip. All of this information is typically printed on the payment card. The user can therefore manually enter this information into the electronic device via e.g. a touchscreen or keypad simply by reading it directly from the payment card, or in some cases an image of the payment card is captured by a camera on the electronic device and processed by the device to obtain the necessary information.

A problem with the provisioning process is that it is possible for an unauthorized user to provision a payment instrument without the knowledge or consent of the authorized user. In this specification, an authorized user is understood to be the instrument holder, i.e. the person to whom the payment instrument was issued by an issuer. An unauthorized user can, for example, provision a stolen payment card simply by reading off the required information directly from the payment card and entering it into their own electronic device. Alternatively the unauthorized user can use stolen payment card data bought from what is known in the art as a 'carding forum' or other criminal network.

Once successfully provisioned, the unauthorized user is free to use the provisioned payment instrument to commit fraud.

Prior art provisioning techniques attempt to solve this problem by including identity checks in the provision process. For example, in the case where the payment instrument is a payment card, the provisioning process may involve requiring the user to input additional information that is not directly available from the payment card, such as a social security number or a piece of 'memorable information' (e.g. mother's maiden name, name of first school, place of birth, etc.). The inputted information is checked against corresponding information stored in the records of the card issuer and the payment card is only provisioned onto the electronic device if the information is found to match. Alternative examples include using out of band communications such as sending a unique SMS code to the cardholder to input, or receiving a phone call where a unique number is played though the cardholders phone. This procedure is adopted for provisioning third path payment instrument.

However, these identity checks do not entirely prevent fraud. It has been found that unauthorized users have been able to successfully pass the identity checks by e.g. using social engineering techniques to gain access to the authorized user's social security number or memorable information or in particular through the simultaneous theft of the payment instrument (e.g. card) and electronic device (e.g. mobile phone). It is therefore clear that improvements in the security of card provisioning are still needed, and in particular which reduce the effectiveness of such social engineering techniques.

SUMMARY OF THE INVENTION

In a first aspect, the present invention provides a method of authenticating a request to provision a payment instrument onto an electronic device, comprising: a) initiating a provisioning process on an electronic device, the provisioning process involving the payment instrument; b) receiving secure data at a secure data entry device, the secure data associated with the payment instrument; c) determining whether the received secure data matches secure data stored on a record associated with the payment instrument and, in the affirmative: d) transmitting a request message from the secure data entry device to a server; e) receiving the request message at the server; f) validating the request message; g) transmitting a response message to the secure data entry device, wherein the response message indicates success or failure of the validation; and wherein, in the event the validation was successful, the response message includes authorization data and the method further comprises: h) receiving data at the electronic device, wherein the authorization data is received at either by the electronic device receiving a transmission from the secure data entry device or by the electronic device reading a barcode or Quick Response code generated by the secure data entry device; i) transmitting the received data from the electronic device to the server; j) determining, at the server, whether the data transmitted by the electronic device includes the authorization data; and k) in the affirmative, transmitting approval for the request to provision the payment instrument to the electronic device.

In a second aspect, the present invention provides a system for authenticating a request to provision a payment instrument, the system comprising: an electronic device; a secure data entry device; and a server; wherein the secure data entry device configured to: receive secure data that is associated with the payment instrument, determine whether the received secure data matches secure data stored on a record associated with the payment instrument and, in the affirmative transmit a request message to the server; wherein the server is configured to: receive the request message, validate the request message and transmit a response message to the secure data entry device, wherein the response message indicates success or failure of the validation; and wherein, in the event the validation was successful, the response message includes authorization data; wherein the electronic device is configured to: initiate a provisioning process thereon, the provisioning process involving the payment instrument; receive data either by receiving a transmission from the secure data entry device or by reading a barcode or Quick Response code generated by the secure data entry device; and transmit the received data to the server; wherein the server is further configured to: determine whether the data transmitted from the electronic device includes the authorization data; and, in the affirmative, transmit approval for the request to provision the payment instrument to the electronic device.

In a third aspect, the present invention provides a method of authenticating a request to provision a payment instrument onto an electronic device, comprising: a) initiating a provisioning process on the electronic device, the provisioning process involving the payment instrument; b) receiving secure data at a secure data entry device, the secure data associated with the payment instrument; c) determining whether the received secure data matches secure data stored on a record associated with the payment instrument and, in the affirmative: d) transmitting a request message from the secure data entry device to a server; e) receiving the request message at the server and validating the request message; f) transmitting a response message to the secure data entry device, wherein the response message indicates success or failure of the validation; g) generating, at the server, an identification message based on the response message, wherein the identification message is indicative of the success or failure of the validation; and h) based on the identification message, either approving the request to provision the payment instrument or declining the request to provision the payment instrument.

In a fourth aspect, the present invention provides a system for authenticating a request to provision a payment instrument, the system comprising: an electronic device; a secure data entry device; and a server; wherein the electronic device is configured to initiate a provisioning process thereon, the provisioning process involving the payment instrument; wherein the secure data entry device configured to: receive secure data that is associated with the payment instrument, determine whether the received secure data matches secure data stored on a record associated with the payment instrument and, in the affirmative transmit a request message to the server; wherein the server is configured to: receive the request message, validate the request message; transmit a response message to the secure data entry device, wherein the response message indicates success or failure of the validation; generate an identification message based on the response message, wherein the identification message is indicative of the success or failure of the validation; and, based on the identification message, either approve the request to provision the payment instrument or decline the request to provision the payment instrument.

In a fifth aspect, the present invention provides a method of authenticating a request to provision a payment instrument onto an electronic device, comprising: a) receiving secure data at a secure data entry device, the secure data associated with the payment instrument; b) determining whether the received secure data matches secure data stored on a record associated with the payment instrument and, in the affirmative: c) transmitting a request message from the secure data entry device to a server; d) receiving, at the secure data entry device, a response from the server and determining whether the received response contains authorization data indicating authorization of a transaction and, in the affirmative: e) receiving the authorization data at the electronic device, wherein the authorization data is received either by receiving a transmission from the secure data entry device or by reading a barcode or Quick Response code generated by the secure data entry device; and f) transmitting the authorization data from the electronic device to the server.

In a sixth aspect, the present invention provides a system for authenticating a request to provision a payment instrument onto an electronic device, comprising: a secure data entry device configured to: receive secure data associated with the payment instrument; determine whether the received secure data matches secure data stored on a record associated with the payment instrument and, in the affirmative, transmit a request message to a server, receive a response from the server and determine whether the received response contains authorization data indicating authorization of a transaction; wherein the electronic device is configured to receive the authorization data and to transmit the authorization data to the server, wherein the authorization data is received either by receiving a transmission from the secure data entry device or by reading a barcode or Quick Response code generated by the secure data entry device.

In a seventh aspect, the present invention provides a method of authenticating a request to provision a payment instrument onto an electronic device, comprising: a) receiving, at a server, a provisioning request message from the electronic device; b) receiving, at a server, a request message from a secure data entry device; c) validating the request message; d) transmitting a response message to the secure data entry device, wherein the response message indicates success or failure of the validation; and wherein, in the event the validation was successful, the response message includes authorization data and the method further comprises: e) receiving, at the server, a message from the electronic device and determining whether the message contains the authorization data; and f) in the affirmative, transmitting approval for the request to provision the payment instrument to the electronic device.

In an eighth aspect, the present invention provides A system for authenticating a request to provision a payment instrument onto an electronic device, the system comprising a server that is configured to: receive, at the server, a provisioning request message from the electronic device; receive a request message from a secure data entry device; validate the request message; transmit a response message to the secure data entry device, wherein the response message indicates success or failure of the validation; and wherein, in the event the validation was successful, the response message includes authorization data; receive a message from the electronic device; and determine whether the message contains the authorization data; and, in the affirmative, transmit approval for the request to provision the payment instrument to the electronic device.

In an ninth aspect, the present invention provides A method of authenticating a request to provision a payment instrument onto an electronic device, comprising: a) receiving, at a server, a unique identifier associated with the payment instrument, the unique identifier received from the electronic device; b) receiving, at a server, a request message from a secure data entry device; c) validating the request message; d) transmitting a response message to the secure data entry device, wherein the response message indicates success or failure of the validation; e) generating an identification message based on the response message, wherein the identification message is indicative of the success or failure of the validation; and f) based on the identification message, either approving the request to provision the payment card or declining the request to provision the payment instrument.

In a tenth aspect, the present invention provides A system for authenticating a request to provision a payment instrument onto an electronic device, the system comprising a server that is configured to: receive a unique identifier associated with the payment instrument from an electronic device; receive a request message from a secure data entry device; validate the request message; transmit a response message to the secure data entry device, wherein the response message indicates success or failure of the validation; generate an identification message based on the response message, wherein the identification message is indicative of the success or failure of the validation; and based on the identification message, either approve the request to provision the payment instrument or decline the request to provision the payment instrument.

In an eleventh aspect, the present invention provides a secure data entry device, comprising: a payment instrument reading module configured to read a payment instrument; a mode select module having a first mode and a second mode, wherein the second mode facilitates identification of a user; and a network interface module; wherein the secure data entry device is configured to determine if the second mode is selected and further configured to, in the event the determination is in the affirmative, either: transmit authorization data associated with a transaction involving the payment instrument to an electronic device; or generate a barcode or Quick Response code encoding the authorization data, the barcode or Quick Response code suitable for being read by the electronic device.

Further preferred features of these aspects of the invention are set out in the appended dependent claims.

BRIEF DESCRIPTION OF THE DRAWINGS

Embodiments of the present invention are now described, by way of example only, with reference to the accompanying drawings, in which.

DETAILED DESCRIPTION OF EMBODIMENTS

Figure 1:
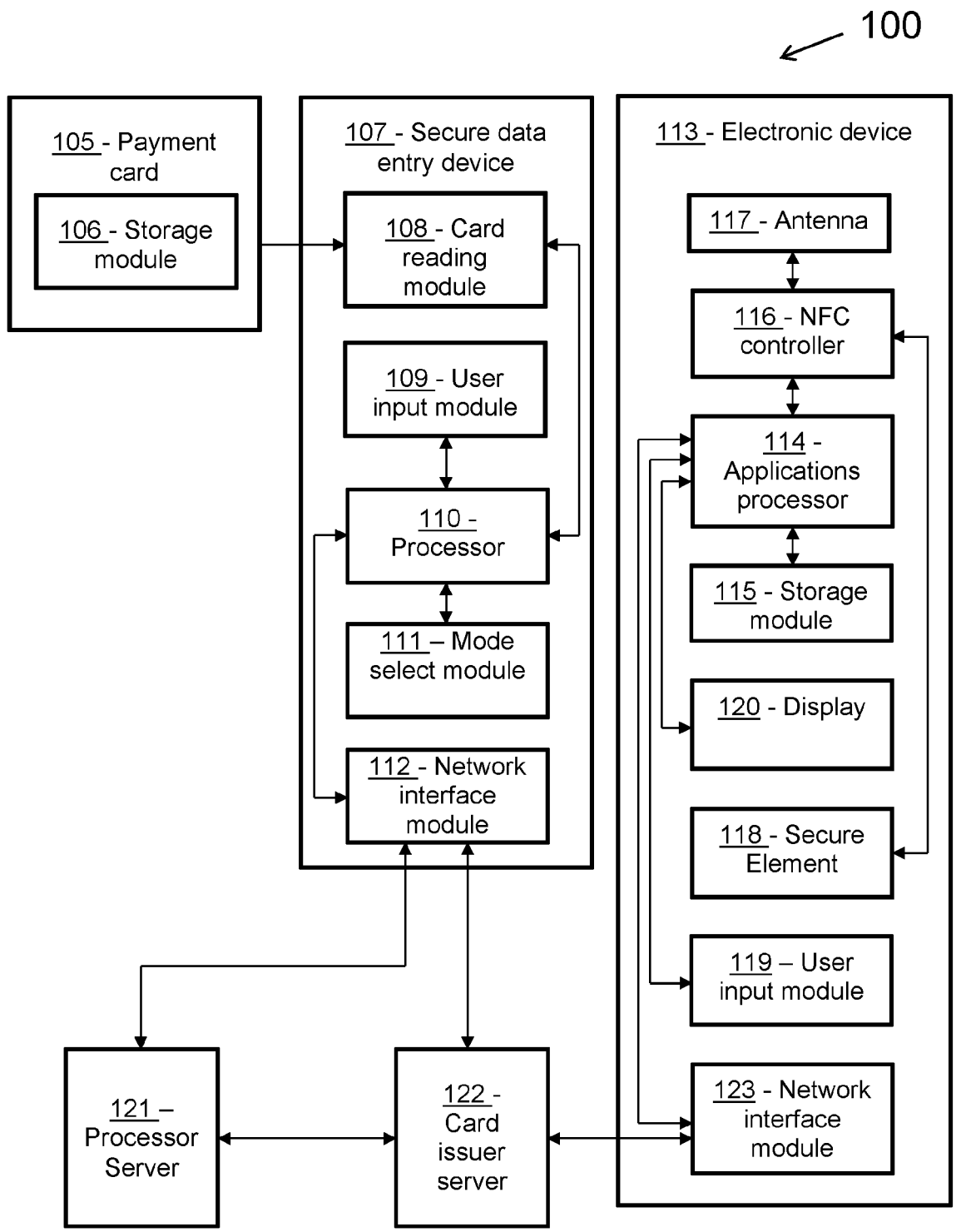
FIG. 1 is a schematic diagram of a system suitable for implementing all embodiments of the present invention.
Figure 2:
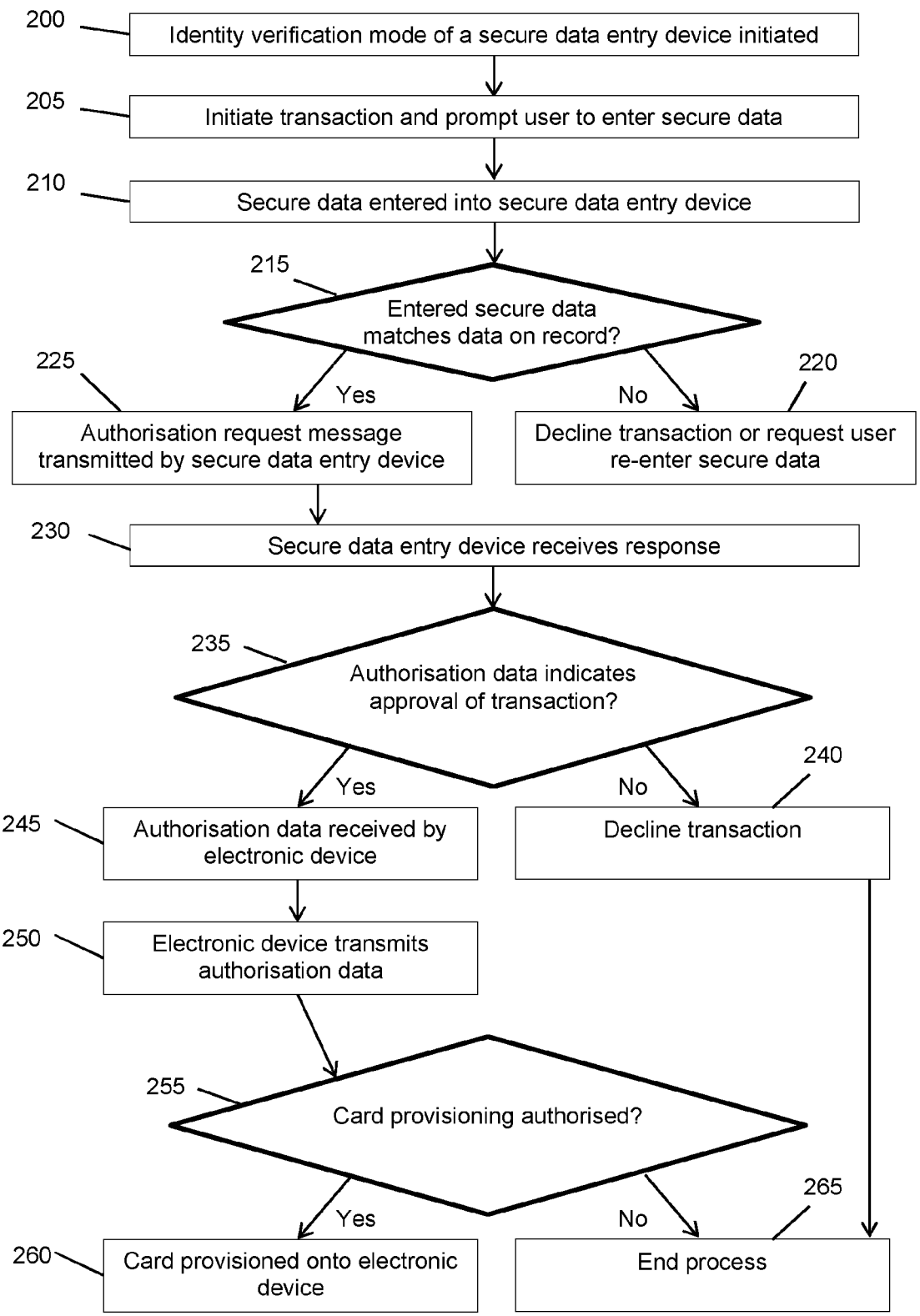
FIG. 2 is a flow diagram showing operation of a secure data entry device and an electronic device during identity validation, according to a first embodiment.
Figure 3:
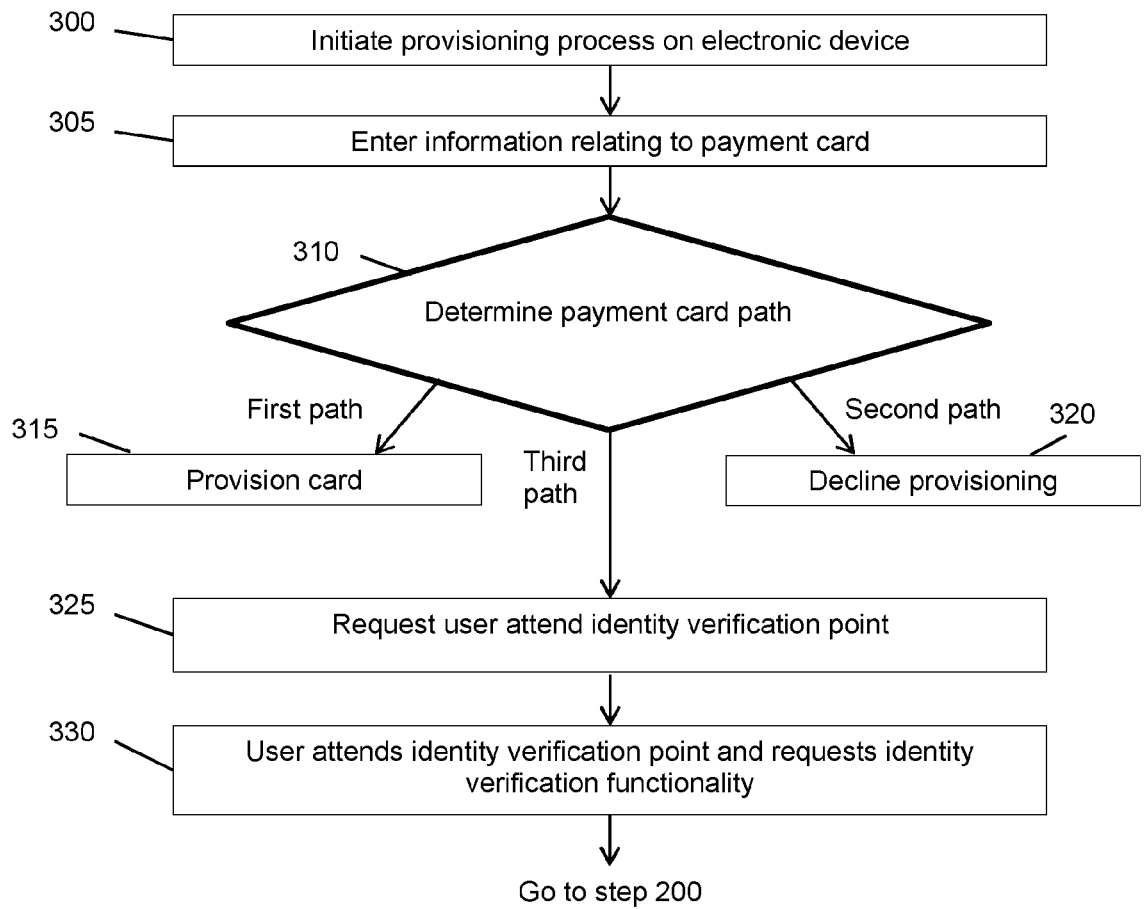
FIG. 3 is a flow diagram showing operation of an electronic device prior to identity validation, according to the first embodiment.
Figure 4:
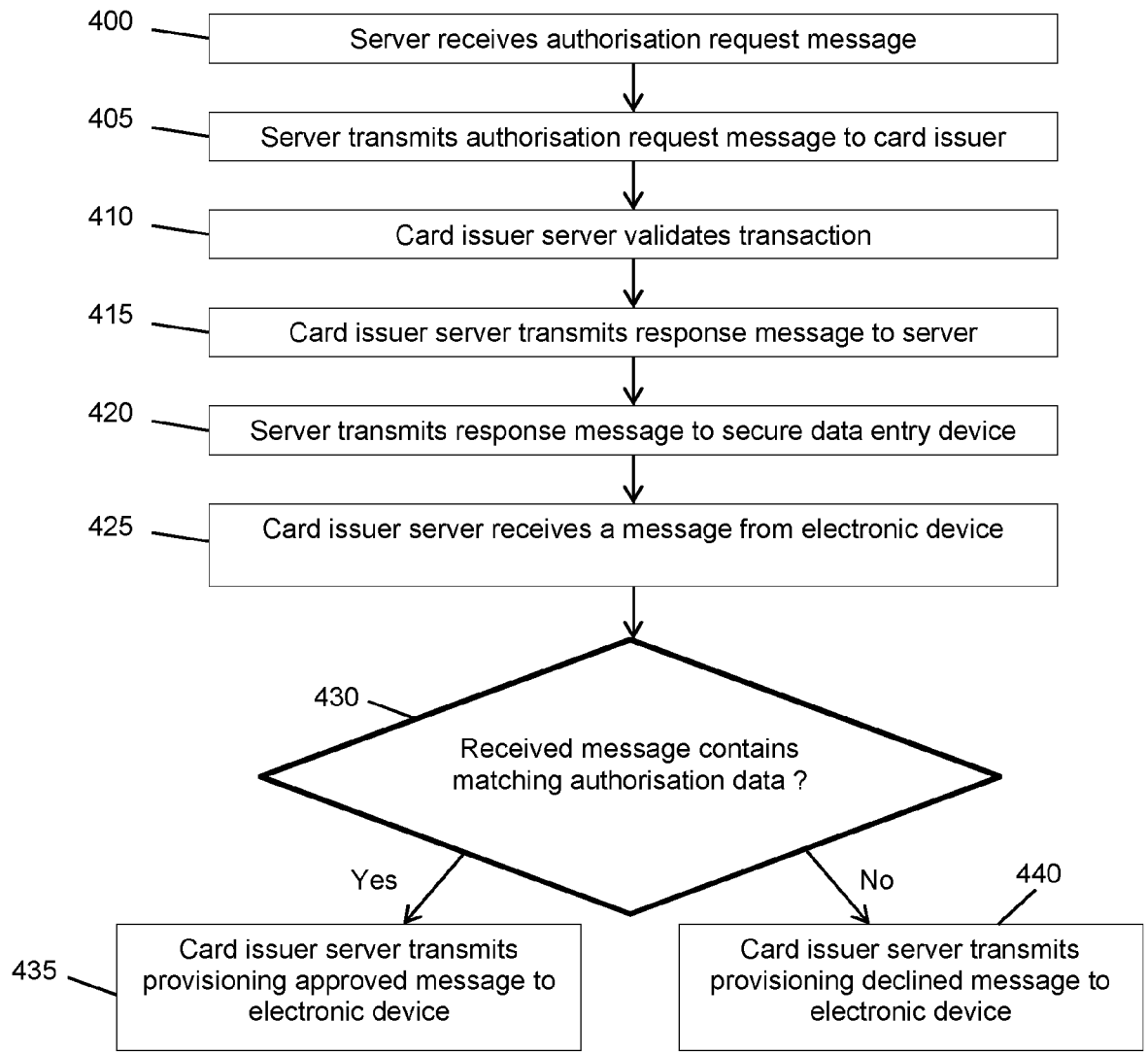
FIG. 4 is a flow diagram showing operation of a server and card issuer server according to the first embodiment.
Figure 5:
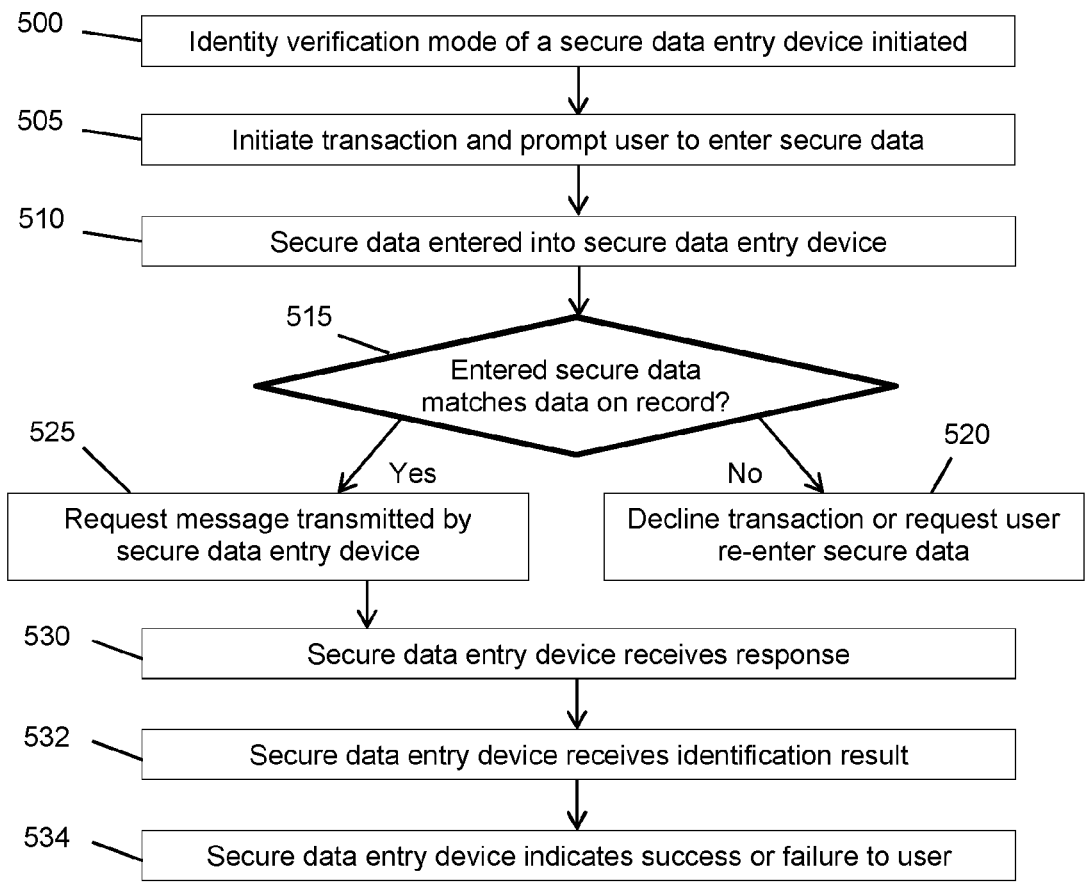
FIG. 5 is a flow diagram showing operation of a secure data entry device and an electronic device during identity validation, according to a second embodiment.
Figure 6:
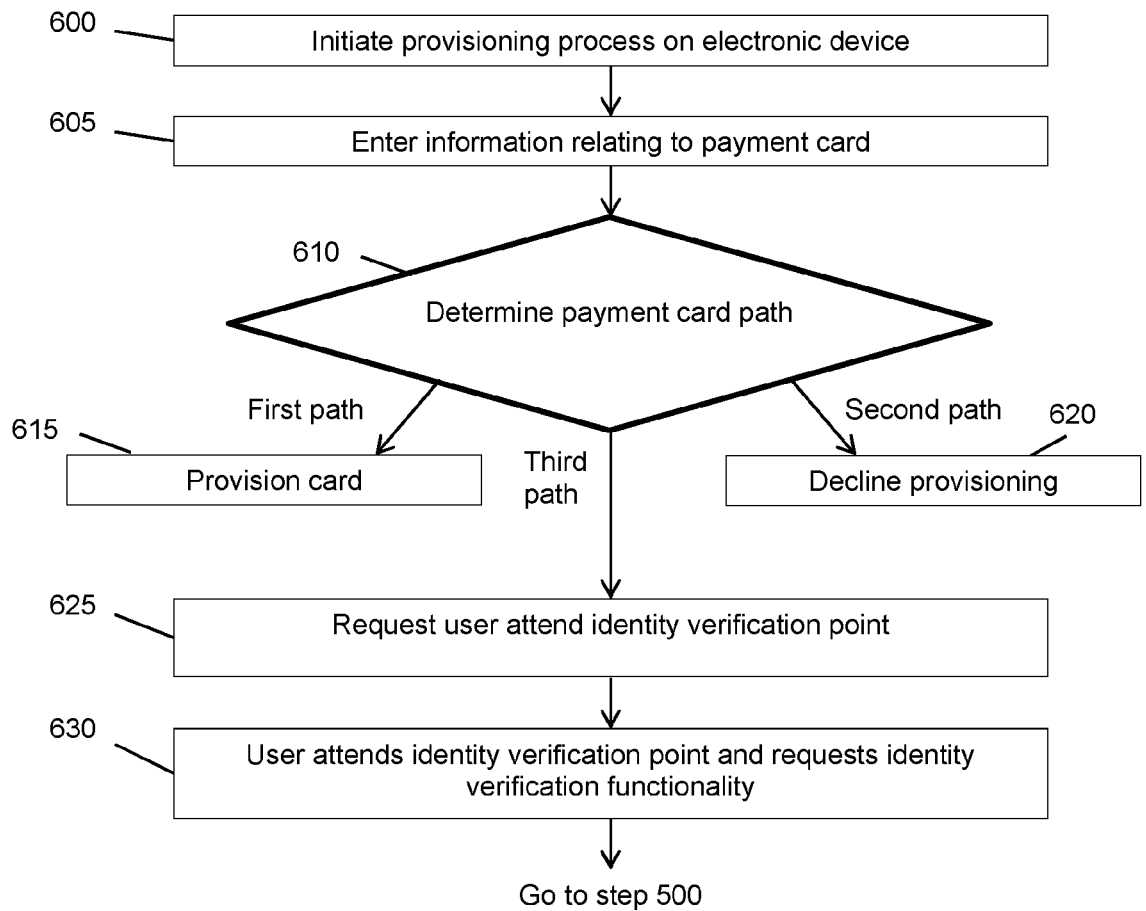
FIG. 6 is a flow diagram showing operation of an electronic device prior to identity validation, according to the second embodiment.
Figure 7:
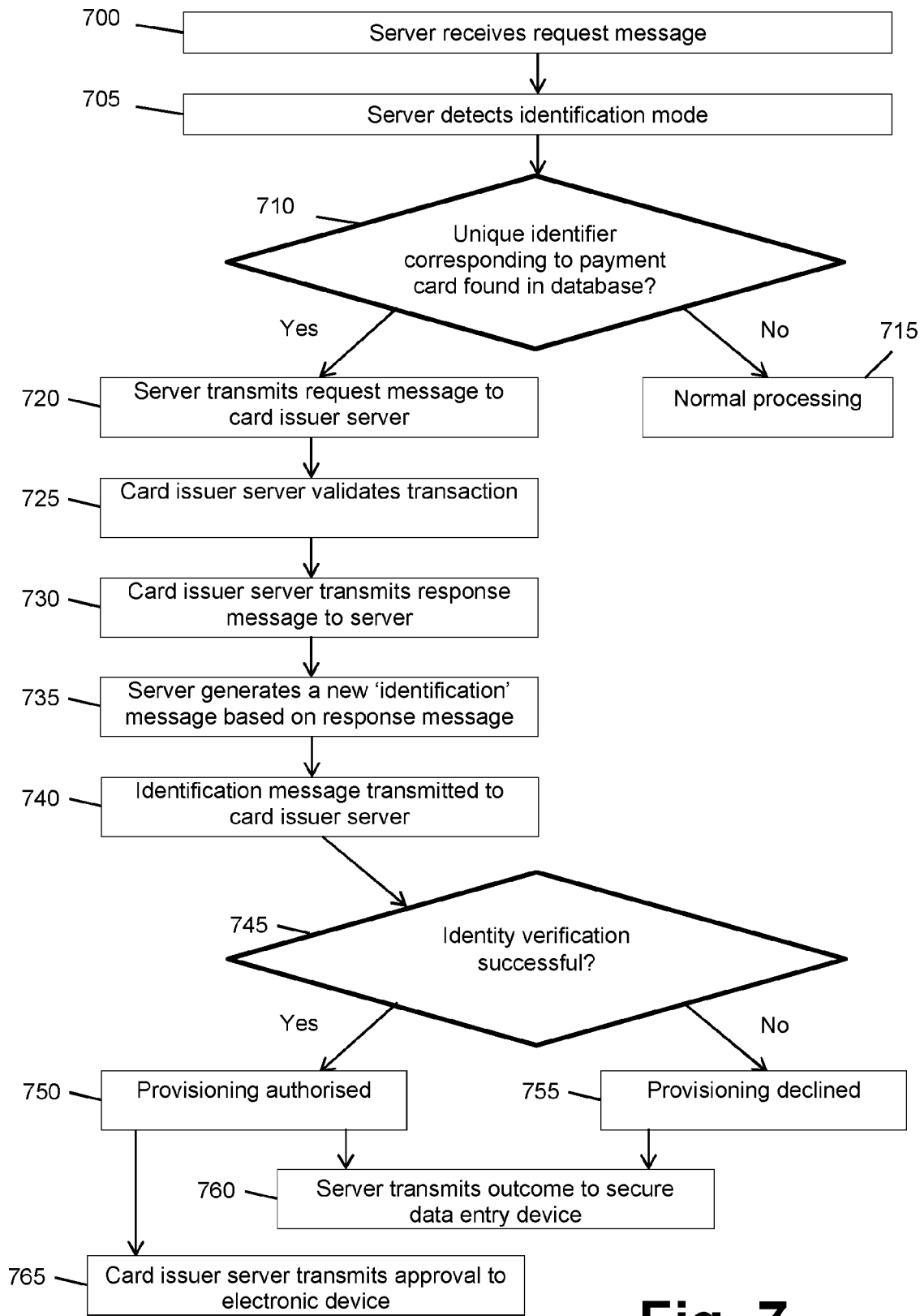
FIG. 7 is a flow diagram showing operation of a server and card issuer server according to the second embodiment.
Figure 8:
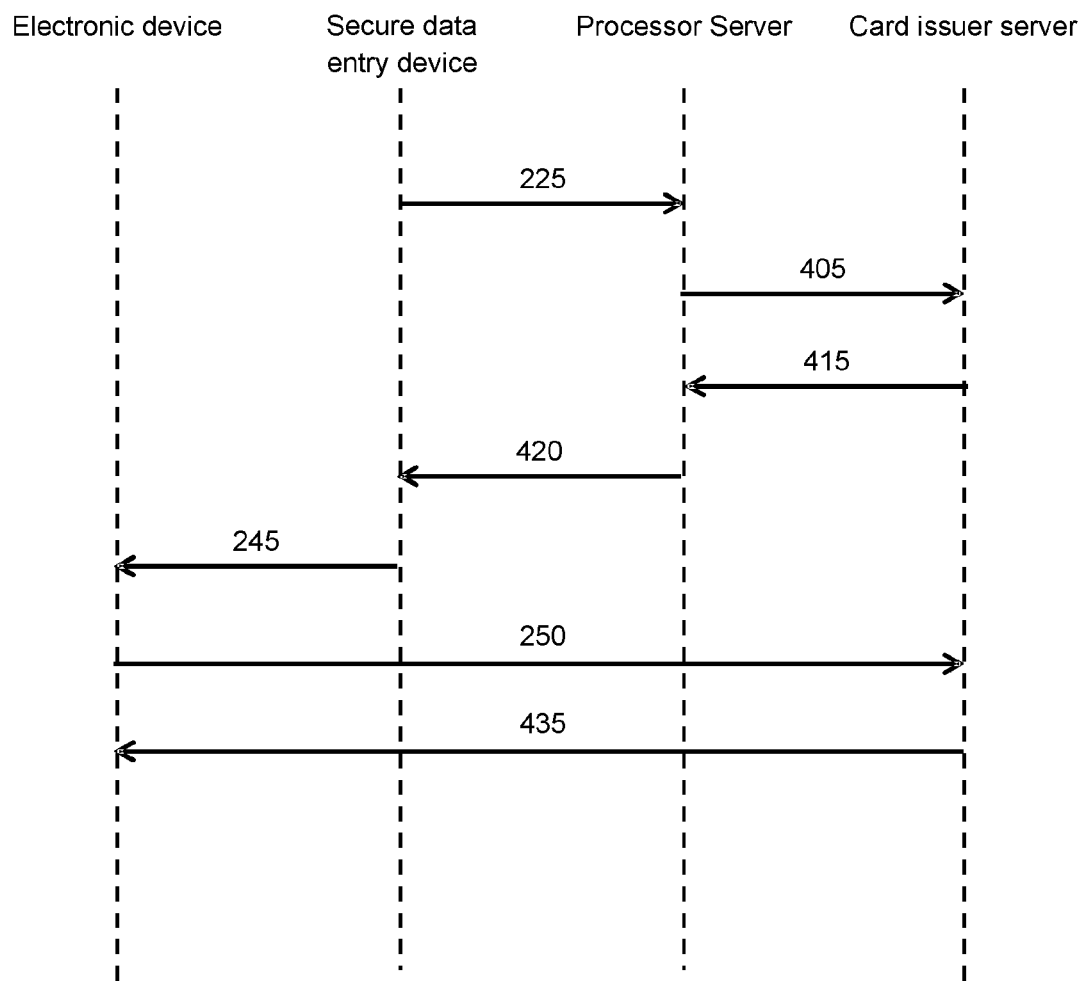
FIG. 8 is a sequence diagram showing operating of the system of FIG. 1 according to the first embodiment.
Figure 9:
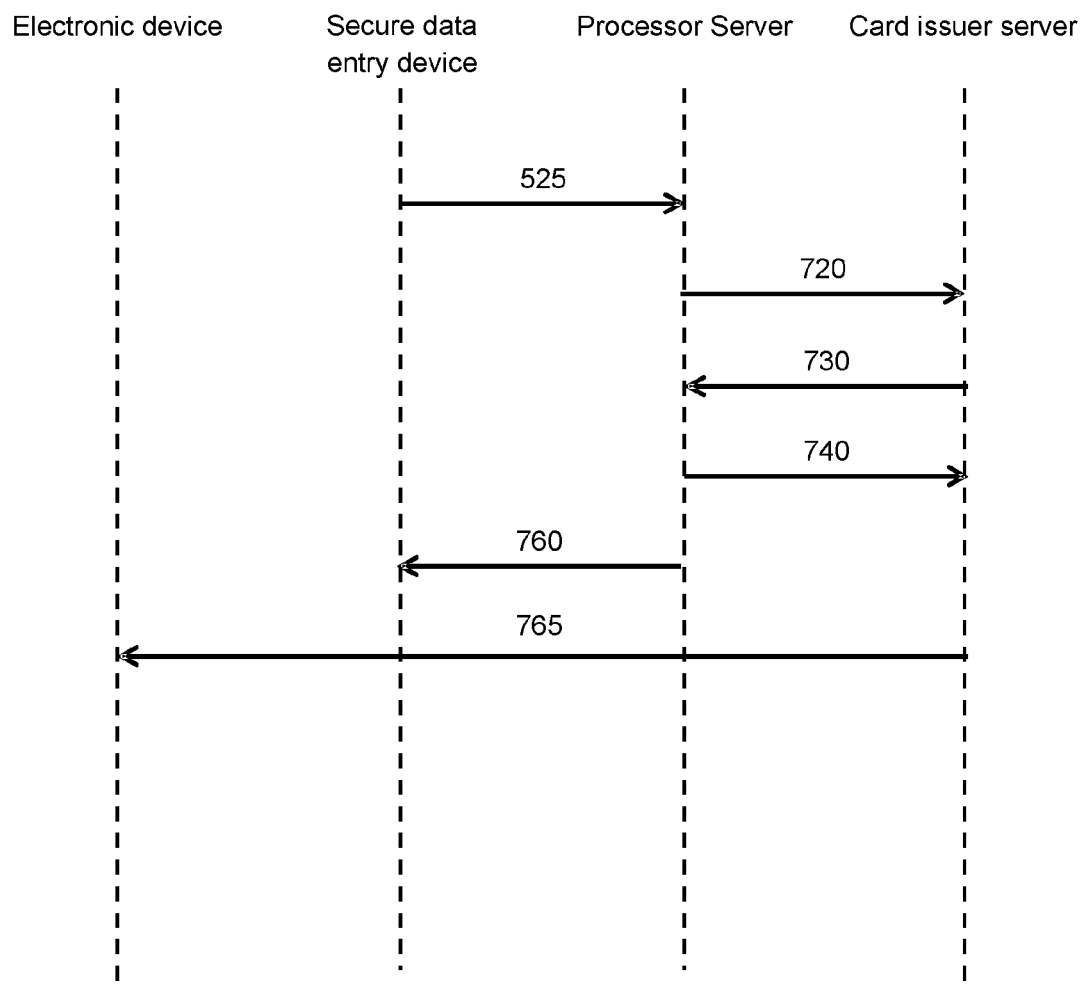
FIG. 9 is a sequence diagram showing operating of the system of FIG. 1 according to the second embodiment.

The following detailed description is structured as follows. FIG. 1 and related description show and describe a system 100 suitable for implementing all embodiments of the present invention. FIGS. 2, 3 and 4 show operation of the various components of system 100 according to a first embodiment and FIGS. 5, 6 and 7 show operation of the various components of system 100 according to a second embodiment. FIG. 8 is a sequence diagram showing the operation of system 100 according to the first embodiment and FIG. 9 is a sequence diagram showing the operation of system 100 according to the second embodiment.

In the present disclosure, a payment instrument is understood to encompass any device, means or mechanism for effecting a non-cash payment. A very well-known payment instrument is a payment card, and for this reason the following disclosure focusses on embodiments that make use of payment cards. It should however always be kept in mind that the present invention is applicable to payment instruments in general and that therefore references to a 'payment card' in the following should be understood to be a reference to a payment instrument in general. Other examples of payment instruments include virtual (provisioned) payment cards and fobs. Many other examples of payment instruments will be known to a skilled person, and such payment instruments are also compatible with the present invention.

FIG. 1 shows a schematic diagram of a system 100 suitable for implementing all embodiments of the present invention. System 100 includes a payment card 105, a secure data entry device 107, an electronic device 113, a server 121 and a card issuer server 122. Each of these elements is described in turn below.

In FIG. 1, payment card 105 is a physical plastic payment card of the type well known in the art. However, the invention is not limited in this respect and payment card 105 can alternatively be any payment instrument known to a skilled person.

Payment card 105 includes a storage module 106 on which data relating to payment card 105 is stored. This data may include, for example, a Primary Account Number (PAN) associated with the card, the name of an authorized user, an expiry date of the card and/or any other data deemed useful by a skilled person. In this embodiment storage module 106 is an integrated circuit, such that in this embodiment payment card 105 is suitable for use with the 'chip and PIN' payment system that is well known in the art. It will be appreciated that the invention is however not limited in this respect, and storage module 106 may be any other storage means known to the skilled person such as a magnetic stripe or secure element in an electronic device. Payment card 105 may alternatively or additionally includes an antenna (not shown) to allow it to communicate wirelessly with secure data entry device 107. This is known in the art as a 'contactless' payment system.

System 100 also includes a secure data entry device 107. Secure data entry device 107 can be any secure data entry device known in the art that has been modified to include a mode select module 111 as described later in this specification. In this embodiment, secure data entry device 107 is a Pin Entry Device ('PED') such as the VeriFone® VX 820 Card Secure PIN entry device as available from VeriFone® UK Limited. The invention is however not limited in this regard and any device suitable for receiving entry of secure data from a user can be used instead of a Pin Entry Device.

Secure data entry device 107 is configured to allow a user to input secure data that is associated with payment card 105. Secure data entry device 107 includes a payment instrument reading module that, in this embodiment, takes the form of card reading module 108. Card reading module 108 is configured to read data from storage module 106 of payment card 105. In this embodiment card reading module is an integrated circuit reader. It will be appreciated that the invention is however not limited in this respect, and card reading module 108 may be any reading means known to the skilled person that is suitable for reading data from storage module 106, such as a magnetic stripe reader or Near Field Communication (NFC) reader. Card reading module 108 may comprise multiple card reading means. In the case where the payment instrument is not a payment card, a skilled person will be able to readily select an appropriate form for the payment instrument reading module.

Secure data entry device 107 also includes a user input module 109 that is configured to accept input from a user. In this embodiment, user input module 109 is a keypad configured to allow a user to enter a Personal Identification Number (PIN) into secure data entry device 107. In this embodiment, as mentioned above, secure data entry device 107 may be referred to as a PIN Entry Device (PED). As is known in the art, a PIN is a numeric code that is associated with payment card 105 and is known (at least in theory) only by an authorized user of payment card 105. In this way, a PIN is one example of secure data in the context of the present invention. During a transaction, secure data entry device 107 compares an entered PIN with a PIN that is stored on a record associated with payment card 105. If these are found to match, then the transaction is authorized. If the entered PIN does not match the PIN on record for payment card 105, then the transaction is declined, or the user is asked to re-enter their PIN.

Other embodiments in which user input module 109 takes a different form are also contemplated. For example, in another embodiment user input module 109 is a fingerprint scanner. In this alternative embodiment, the secure data is the fingerprint of the user. A skilled person having the benefit of the present disclosure will be able to determine other suitable forms for user input module 109 and for the corresponding secure data. For example, other biometric scanning means may be used to user input module 109, with the corresponding biometric data being used as the secure data.

User input module 109 can optionally also be used by a merchant or retailer to input retailer commands, typically amount to be entered, cash back amount, and to amend any of the settings on secure data entry device 107. This functionality is preferred where secure data entry device 107 is deployed in an environment where there is not a separate retailer till system (a 'Point of Sale' terminal) connected to secure data entry device 107.

Secure data entry device 107 further includes a processor 110 that is configured to control the operation of the other components of secure data entry device 107, including any combination of card reading module 108, user input module 109, mode select module 111 and network interface module 112. It will be appreciated that secure data entry device 107 may include other hardware and/or software components that are not explicitly shown in FIG. 1, and further that processor 110 may be configured to control any such further components. Processor 110 comprises any known data processing means, and in this embodiment processor 110 is a microcontroller.

Secure data entry device 107 preferably also includes a mode select module 111. Mode select module 111 has a first setting which, when selected, causes secure data entry device 107 to behave in the same manner as a prior art secure data entry device. This first setting is referred to herein as data processing device operating in 'normal' mode.

Mode select module 111 also has a second setting which, when selected, causes secure data entry device 107 to behave in a manner different from that of a prior art secure data entry device. This second setting is referred to herein as data processing device operating in 'identity verification' mode. Further description of secure data entry device 107 operating in identity verification mode is set out later in this specification. It will thus be understood that prior art secure data entry devices do not include a component equivalent to mode select module 111.

In this embodiment, mode select module 111 includes a button that is provided in an exterior housing of secure data entry device 107 such that it is accessible to a user of secure data entry device 107. A user depresses the button to switch secure data entry device 107 from the normal mode to the identity verification mode. The invention is however not limited in this respect, and mode select module 111 can be implemented in many other forms. For example, mode select module 111 may alternatively be communicatively coupled to a point of sale terminal (not shown) and may be configured to receive commands from the point of sale terminal in order to switch between operating modes. Mode select module 111 may be communicatively coupled to network interface module 112 to facilitate reception of commands. Additionally, instead of a button, mode select module 111 may include any other user interface means suitable for toggling operation modes, such as a touchscreen, or a combination of buttons such as a 'shift-F1' type combination. Additionally, secure data entry device 107 could default to having identity verification mode as the initial operation without any user input.

It is also contemplated that secure data entry device 107 can be provided without mode select module 111. In this case the normal payment options of secure data entry device 107 are disabled or otherwise not present, such that secure data entry device 107 can only operate in a stand-alone single purpose identity verification mode. It will be understood that this arrangement is covered by the present invention, as it may be thought of as a secure data entry device for which mode select module 111 is permanently set in identity verification mode.

Secure data entry device 107 additionally includes a network interface module 112 that is configured to transmit data out from secure data entry device 107 and to receive data into secure data entry device 107. Network interface module 112 is well known in the art and as such is not described in further detail here. Network interface module 112 is connectable to any suitable private or public network, such as the Internet. Network interface module 112 may be in communication with any combination of server 121, card issuer server 122, a point of sale terminal, and/or any other data processing device or the like.

Secure data entry device 107 is not limited to a PED. For example, secure data entry device 107 may be an Automated Teller Machine (ATM), an Unattended Payment Terminal (UPT), a Semi attended Cardholder Activated Payment Terminal (SACAT) or an Automated Fuel Dispenser (AFD). Further modifications are possible.

In the case of an ATM in particular, the ATM preferably includes a communication module that is capable of transmitting data to electronic device 113; i.e. one-way communication. The communication module can be any of:
  a Near Field Communication (NFC) antenna;
  a Bluetooth transmitter, and preferably a Bluetooth Low Energy, BLE, transmitter;
  an acoustic transmitter such as a loudspeaker, where analog audio signals are converted to digital data by a microphone in electronic device 113;
  an light emitting device such as a light emitting diode, possibly an infrared light emitting diode, for detection by a photodetector in electronic device 113;
  a magnetic field generating device such as a coil of wire that is capable of generating a magnetic field for detection by a magnetic field sensor in electronic device 113;
  a motor capable of transmitting vibrations and/or rotations from the ATM to electronic device 113, for detection by accelerometers in electronic device 113;
  a chamber that is capable of being pressurised and depressurised whilst electronic device 113 is within it, so as to transmit data to electronic device 113 via pressure changes that can be detected by a barometer in electronic device 113.

It will be appreciated that regardless of the configuration of the communication module, data does not need to be transmitted from electronic device 113 to the ATM.

System 200 also includes an electronic device 113 that is configured for provisioning payment card 105. It will be appreciate that, in the interests of clarity, only those elements of device 113 that are pertinent to the present invention are shown in FIG. 1 and that consequently electronic device 113 may include additional non-illustrated elements.

Electronic device 113 is preferably a portable electronic device; i.e. it is suitable for being carried around on a user's person. However, the invention is not limited in this respect. In the illustrated embodiment electronic device 113 is a mobile telephone, preferably a smartphone, but it will be appreciated that the invention is not limited in this respect and that device 113 could be any of a tablet, a games console, a smart television, a wearable electronic device, a watch, a beacon, or a payment card alternative such as 'Coin' as supplied by Coin, Inc or a looppay case or card as supplied by ©2015 LoopPay Inc. Other suitable electronic devices compatible with the present invention will be apparent to a skilled person having the benefit of the present disclosure.

Electronic device 113 includes an applications processor 114 that is configured to execute one or more applications ('apps') that are stored on a storage module 115. Applications processor 114 can be any suitable data processing device known in the art, such as a microprocessor. Applications processor 114 is communicatively coupled to a Near Field Communication (NFC) controller 115, and NFC controller 116 is in turn communicatively coupled to an antenna 117. This arrangement allows device 113 to transmit data to and receive data from other external devices such as secure data entry device 107 using well known NFC communication techniques. This arrangement of hardware and its operation to transmit and receive data is well known in the art and hence is not described in detail here. It will be appreciated that NFC controller 116 can be replaced with, or provided in addition to, any other network interface component, such as a Wi-Fi module and/or a Bluetooth module.

Applications processor 114 is also communicatively coupled to user input module 119, display 120 and network interface module 123 and is configured to control these components of electronic device 113. Applications processor 114 may also be configured to control any additional hardware and/or software components that are provided in electronic device 113.

Electronic device 113 may also include a secure element 118, which is where provisioned payment card details are stored. As noted earlier, the payment card details may be stored with additional information such as any combination of cryptographic material, payment card configuration, private cryptographic keys and public cryptographic keys. The payment card details can be, for example, a Primary Account Number ('PAN') or a tokenised PAN, and in the case of a payment instrument that is not a payment card the details may be e.g. a sort-code and account number combination. Other suitable details will be readily selected by a skilled person having the benefit of the present disclosure, according to the nature of the payment instrument.

Alternatively the payment card details and the above-mentioned optional additional information can be stored in software, perhaps with some of the data stored remotely from the electronic device on a server. This is referred to in the art as 'the cloud'. This is defined for example in Visa cloud based payments specification. In this case secure element 118 can be omitted.

As is known in the art, secure element 118 may be a non-volatile memory card such as a micro Secure Digital card (microSD) or a Subscriber Identity Module (SIM) card. In the illustrated embodiment secure element 118 is communicatively coupled to NFC controller 116 to facilitate payment using a provisioned card. NFC controller 116 may be embedded in the chipset of electronic device 113. Alternatively, secure element 118 may be communicatively coupled to a dedicated NFC controller and antenna, or may itself include an integrated NFC controller and antenna. Whatever the specific configuration of secure element 118, what is important is that apps executed by applications processor 114 cannot access secure element 118. This separation ensures the security of provisioned card data. Secure element 118 is not essential to the invention and it may be replaced by e.g. a Trusted Execution Environment (TEE) as is known in the art or cloud based payments as is known in the art.

Electronic device 113 may further include a user input module 119 that is configured to accept input from a user. Any suitable human interface device may be used for user input module 119, including but not limited to a touchscreen, a keypad having one or more buttons, a trackpad, a keyboard, a mouse, etc. User input module 119 may comprise more than one human interface device. Electronic devices that do not include user input module 119 are also contemplated; for example, a wearable electronic device may accept and use remote connected user input.

Electronic device 113 may additionally include a display 120 that is configured to display information to a user. Any display known to the skilled person can be used for display 120. Display 120 may be a touchscreen display, in which case display 120 may be part of user input module 119. Electronic devices that do not include display 120 are also contemplated. For example, display 120 can also be a remote display that is provided on another device, for example used when a wearable communicates to the user via an interface on a mobile telephone. Alternatively, display 120 can be removed and replaced by an audio interface, or other human interface (e.g. haptic, audio, braille, smell, etc.)

System 100 also includes a processor server 121 that is configured to transmit data to and receive data from secure data entry device 107 and any suitable private or public network, e.g. the Internet. Processor server 121 is also configured to transmit data to and receive data from a card issuer server 122 via any suitable private or public network, e.g. the Internet. Hereinafter processor server 121 is referred to simply as 'server 121', for brevity.

Server 121 is a server that is associated with an entity that is providing an identity verification service according to the present invention. This entity could be, for example, a card acquirer, a Payment Service Provider, or some other processor of identity verification services. Card acquirer and Payment Service Provider are both terms of art. Here, 'associated with' is understood to mean that the associated entity can transmit data and/or instructions to and receive data and/or instructions from card issuer server 121. The present invention is however not limited in this respect and server 121 can be associated with any entity deemed appropriate by a skilled person.

Card issuer server 122 is a server that is associated with a card issuing entity. Alternatively, card issuer server 122 may be associated with a separate entity that is acting on behalf of a card issuing entity, e.g. an agent or other such intermediary such as a payment scheme operator. Here, 'associated with' is understood to mean that the associated entity can transmit data and/or instructions to and receive data and/or instructions from card issuer server 122.

In FIG. 1 server 121 and card issuer server 122 are shown as separate entities. This is done purely in the interests of clarity of illustration and it will be appreciated that the invention is not limited in this respect. For example, server 121 and card issuer server 122 may be the same data processing device or the same distributed system. Therefore, in the event server 121 and card issuer server 122 are the same data processing device or the same distributed system, references to server 121 in the following should be understood to be synonymous with references to card issuer server 122, and references to card issuer server 122 in the following should be understood to be synonymous with references to server 121. An example of this is an ATM, where the card issuer may be the same as the ATM provider, in which case server 121 and card issuer server 122 may be the same entity.

Additionally or alternatively, one or both of server 121 and card issuer server 122 may comprise a distributed system in which multiple data processing devices are communicably coupled to one another in a manner that allows the coupled data processing devices to interact with one another to achieve a common objective. The individual data processing devices may communicate directly with one another, or via additional routing components, over one or more private and/or public networks, e.g. the Internet. The individual data processing devices may be at a common physical location, or they may be at different physical locations. Further such modifications are possible. Such distributed systems are well known in the field of computing and hence are not described in detail here.

Operation of the present invention according to the first embodiment is described below with reference to FIGS. 2, 3 and 4.

With reference to FIG. 2, the operation of secure data entry device 107 according to the first embodiment is described below.

In step 200, mode select module 111 causes secure data entry device 107 to enter identity verification mode. In this embodiment, an operator presses a button that is part of mode select module 111 to cause secure data entry device 107 to enter identity verification mode. The button could be a physical button or it could be a touch button as known in the art. It will be appreciated that the present invention is not limited in this respect and that other mechanisms for switching secure data entry device 107 to identity verification mode can alternatively be used. For example, a combination of buttons could be pressed to enter identity validation mode. It should also be appreciated that the normal mode operation of secure data entry device 107 is as any prior art secure data entry device operates during a transaction involving a payment card, and further that identity verification mode is different to this normal operating mode. Here, 'normal operating mode' includes any type of transaction that is known in the art, including a financial transaction such as a purchase or a refund, a balance enquiry, a pre-authorization transaction and a payment card-validity check transaction. In some cases one or more function keys are provided to allow an operator to select the transaction type. It should be appreciated that these prior art function keys are not equivalent to mode select module 111, since they do not enable operation of secure data entry device 107 according to the present invention, as described below.

As noted earlier, in an alternative embodiment secure data entry device 107 is defaulted to identity verification mode. In that case, step 200 is omitted and the method instead starts at step 205.

In step 205, a transaction is initiated. In this embodiment, the transaction is a zero value authorization transaction of the type well known in the art. In this type of transaction, the payment amount associated with the transaction is zero. In this case a zero transaction amount may be displayed to a user by secure data entry device 107. Alternatively, the transaction may relate to a non-zero amount, indicating that goods and/or services are being paid for in addition to the identity verification procedure. Other transaction types known to the skilled person, such as a one dollar authentication transaction, may alternatively be initiated in step 205. The nature of the transaction is not critical to the working of the invention.

Whatever the nature of the transaction, in step 205 the user is also prompted to enter their secure data into secure data entry device 107. In the illustrated embodiment the secure data is a PIN associated with payment card 105, but the invention is not limited in this respect and any other secure data known to the skilled person can alternatively comprise the secure data. For example, the secure data may be biometric data, e.g. a fingerprint, or the secure data may be magnetic stripe data generated when card reading module 108 reads a magnetic stripe (MSR) on payment card 105. The invention is however not limited in this respect and any known or future Cardholder Verification Method (CVM) or other method of verifying an individual's identity can alternatively be used.

Following this, in step 210 the user enters their secure data into secure data entry device 107 using user input module 109. Entry of secure data into a secure data entry device is well known in the art and hence is not described in detail here.

In step 215, the secure data entered in step 105 is checked against the secure data that is stored on a record associated with payment card 105. If the entered secure data does not match the secure data on record for payment card 105 then the method proceeds to step 220 where the transaction may be declined, or the user may be prompted to re-enter their secure data. If the transaction is declined then the process ends and card provisioning is not authorized. The secure data may be stored on payment card 105, and specifically in storage module 106 and hence the checking may comprise using card reading module 108 to access storage module 106 to retrieve the stored secure data. Alternatively, the checking may comprise contacting one or both of server 121 and card issuer server 122 and requesting the secure data stored on record for payment card 105.

If the entered secure data does match the secure data on record for payment card 105 then in step 225 a request message is transmitted by secure data entry device 107 to server 121. In this embodiment the request message is an authorization request message. The authorization request message is of the type known in the art and so is not described in detail here. Briefly, the authorization request message comprises a request for a transaction to be authorized by the issuer of payment card 105. It will be appreciated by those skilled in the art that the request message can comprise any other message known in the art that is associated with requesting a service from the card issuer. For example, the request message can be substituted by a card validity check request message, a balance enquiry message, or any other message associated with checking details relating to a payment card with the payment card issuer. Preferably, only the request message is transmitted by secure data entry device 107 to server 121. Secure data entry device 107 does not need to transmit any information relating to electronic device 113, e.g. a mobile telephone number etc.

Additionally, other events may trigger an authorization request message being sent by secure data entry device 107 to server 121 in step 225. For example, if cryptographic checks fail indicating card data in storage module 106 is compromised, or that there may be a replay attack or another compromise of card details is detected, then this may trigger an authorization request message or another type of known message to be transmitted in step 225.

The request message can optionally include an indication that secure data entry device 107 is operating in identity verification mode. The indication may be a flag that indicates that secure data entry device 107 is operating in identity verification mode; e.g. the flag takes a first value when secure data entry device 107 is operating in normal mode and a second, different value when secure data entry device 107 is operating in identity verification mode. The invention is however not limited in this respect and other suitable indications will be apparent to the skilled person having the benefit of the present disclosure. The indication that secure data entry device 107 is operating in identity verification mode may be generated by mode select module 111 directly, or operation of mode select module 111 may cause another component of secure data entry device 107, e.g. processor 110, to generate the indication. The details of the mechanism that causes the creation of the indication are not critical and hence many modifications will be readily apparent to a skilled person having the benefit of the present disclosure.

If the indication is present, it can be used for tracking the occurrences of identity validation mode transactions. This information may be collated and used for billing purposes; specifically, a card acquirer can bill a card issuer for providing the identity validation service on a 'per transaction' basis. Where the indication is a flag, this flag could be passed down later to an acquirer during a reconciliation, log download or settlement event. Alternatively, there could be a special file or message sent to the acquirer from secure data entry device 107 detailing a list of all (or one) of the identity validation transactions to bill the issuer for.

Following transmission, in step 230 secure data entry device 107 receives a response from server 121. In the case that the request message is an authorization request message, the response from server 121 is known as the 'authorization response message' in the art. It will be appreciated that, in cases where a message other than an authorization request message is transmitted in step 225, a corresponding response message will be received in step 230.

Secure data entry device 107 then determines in step 235 whether the received response contains authorization data that indicates approval of the transaction.

The authorization data itself can be any data that is created or otherwise made available during the transaction process. This includes data from an issuer response message and/or data relating to the transaction itself. For example, the authorization data can be an authorization code of the type associated with a magnetic stripe reader, an Authorisation Response Cryptogram (ARPC), an EMV Random Number, an Authorisation code, one or more Scripts and/or combinations thereof; essentially, any cryptographic data or other such predictable data that is created and/or available during the transaction and which can be validated by a card issuer. It will therefore be appreciated that the invention is not limited to any specific form of authorization data, and that the authorization data can be any data that indicates that the secure data entered in step 205 matches corresponding secure data that is on record for the payment card involved in the transaction.

If the authorization response message does not contain authorization data, or if the received data indicates that the transaction has been declined, then in step 240 the transaction is declined. It will be appreciated that a card is not provisioned on the basis of a declined transaction, and so after declining the transaction the process ends by proceeding directly to step 265.

If the authorization response message received indicates that the transaction is requiring a voice authorization (also called a voice referral in the art), then step 235 instead comprises referring the transaction. This is a known function of payment card processing in the art, in which a well-known process in the art is initiated where the issuer can ask the cardholder questions, sometimes directly, sometimes via the merchant operator. This will result in either an authorization where the operator inputs manually an authorization code or a decline where the decision to decline is manually input by the operator. This may be used to ask further security questions from the issuer to the cardholder.

If the authorization response message does contain authorization data indicating approval of the transaction, then in step 245 the authorization data is received by electronic device 113.

In the voice authorization case discussed in the immediately preceding paragraph, assuming that the transaction is authorized, the authorization data received by electronic device 113 in step 245 is the authorization data that was entered by the operator as part of the voice authorization process.

Electronic device 113 can receive the authorization data via many different mechanisms. In this embodiment, step 245 involves the user manually reading the authorization data on e.g. a display of secure data entry device 107 and entering the authorization data manually into electronic device 113 using e.g. user input module 119. Alternatives are possible; for example, in step 245 electronic device 113 may receive an electronic transmission from secure data entry device 107 that contains the authorization data. This may involve, for example, moving electronic device 113 proximate secure data entry device 107 to facilitate wireless communication between electronic device 113 and secure data entry device 107. The wireless communication may be NFC communication or Bluetooth or Bluetooth low energy. Alternatively, the authorization data may be received by electronic device 113 by using electronic device 113 to read a barcode or Quick Response (QR) code that is provided on a receipt generated by secure data entry device 107. Alternatively, the authorization data may be transmitted by secure data entry device 107 by broadcasting sound encoded with the data for the authorization data, which sound is received by a microphone that is part of electronic device 113. The receipt may be a paper receipt or an electronic receipt that is displayed in a suitable location, e.g. on a display of secure data entry device 107. Any of Bluetooth, Bluetooth Low Energy (BLE), Wi-Fi, an acoustic signal (e.g. sound), a light signal (e.g. a series of light pulses), and/or a series of vibrational pulses may be used to transmit the authorization data from secure data entry device 107 to electronic device 113. In each case the authorization data is encoded in the respective signal. The invention is however not limited in this respect and other techniques for causing electronic device 113 to receive the authorization data can also be used.

In step 250, the electronic device 113 transmits the authorization data that it received in step 245 to card issuer server 122, e.g. by using network interface module 123 to communicate with card issuer server 122 via any suitable private or public network, e.g. the Internet. Card issuer server 122 compares the authorization data received from electronic device 113 to the authorization data generated by card issuer server 122 earlier in the process. This is described in more detail later in this specification in connection with FIG. 4.

In step 255, electronic device 113 receives a response from card issuer server 122. This response indicates whether electronic device 113 has authority to provision payment card 105 onto itself. The indication can take any form known to a skilled person, and in the illustrated embodiment the indication is a flag that takes a first value to indicate 'authorized' and a second, different value to indicate 'not authorized'.

In the event that authorization is given, in step 260 the payment card is provisioned onto electronic device 113. Here, provisioning payment card 105 onto electronic device 113 is understood to include provisioning payment card 105 into a remote server (known as 'cloud storage' in the art) via electronic device 113. In all cases, provisioning occurs in the manner well known in the art that will vary according to the specific payment instrument that is being provisioned. In the event that authorization is not given, the provisioning of payment card 105 onto electronic device 113 is not authorized and the process ends at step 265.

It will be appreciated that the process described above in connection with FIG. 2 advantageously allows a card issuing entity to be confident that electronic device 113 is associated with an authorized user of payment card 105 and further that both electronic device 113 and payment card 105 were in the possession of said authorized user when the user identity validation occurred. An additional advantage is that the location of secure data entry device 107 and electronic device 113 may be known to 121 server and/or card issuer server 122, and hence determining whether these locations match can provide further confidence that the authorization is genuine if the locations are found to match, or indicate that the authorization may not be genuine if the locations are not found to match.

With reference to FIG. 3, the operation of electronic device 113 according to the first embodiment is described below.

In step 300, a user initiates a provisioning process on electronic device 113. In this embodiment the provisioning process is initiated by activating a provisioning software application (often referred to as an 'app' in the art) that is stored on storage module 115 and initiating functionality within this application to provision a new payment instrument, which in this case is a payment card. The invention is however not limited in this respect and other mechanisms for initiating the provisioning process on electronic device 113 known to a skilled person can alternatively be used. These mechanisms will vary according to the nature of the payment instrument that is being provisioned.

In step 305, the user enters information relating to payment card 105 that they wish to provision into electronic device 113, e.g. by using user input module 119. The information may include, for example, a PAN and/or an expiry date, although the invention is not limited in this respect and the entered information can comprise any data deemed necessary and/or useful by a skilled person. Optionally, the user may be able to enter information by using electronic device 113 to capturing an image of payment card 105, and electronic device 113 processes the captured image to obtain the necessary information. Alternatively this card information could be populated by using the NFC "read" capability of the electronic device (e.g. phone).

Following this, in step 310 the payment card path is determined. As explained in the background section of this specification, in the art three payment paths are defined. A first path defines a provisioning process for payment instrument that can be provisioned onto an electronic device without the electronic device having to contact the instrument issuer for verification. A second path defines a provisioning process for payment instrument that cannot be provisioned onto an electronic device, such that there is no need to contact the instrument issuer for verification. This path may contain blacklisted cards, for example. A third path defines a provisioning process for payment instrument for which approval from an instrument issuer must be sought by the electronic device before the payment instrument can be provisioned onto the device. It is envisaged that, from time to time and for other reasons including fraud checking, the cardholder may be asked to re-confirm their identify using the third path; i.e. a payment instrument that has previously been on another path may be switched to the third path from time to time.

Determination of the payment card path is known in the art and is not described in detail here. In the event that payment card 105 is determined to be on the first path, then in step 315 the payment card is provisioned on electronic device 113. In the event that payment card 105 is determined to be on the second path, then in step 320 the provisioning of payment card 105 is declined. As noted earlier, the present invention is not concerned with first and second path payment cards and so processing of these types of cards is not described in detail here.

In the event that payment card 105 is determined to be on the third path, then in step 325 electronic device 113 informs the user they are required to attend an identity verification point in order to provision payment card 105. Electronic device 113 can inform the user of this in any suitable way, and in this embodiment a message such as "Please go to your local identity verification point to complete loading of this card onto your device" is displayed to the user by electronic device 113 on display 120. The invention is not limited in this respect and any mechanism for informing a user that attendance of an identity verification point is required known to a skilled person can be used. For example, the user may receive an electronic message such as an email or SMS message informing them that attendance of an identity verification point is required. The user may also be provided with a mechanism to locate nearby identity verification points, such as an electronic map of the type well known in the art, possibly also including directions. It is important to appreciate that, at this point, payment card 105 has not yet been provisioned onto electronic device 113 and is therefore not yet available for use in making payments. Instead, a provisioning request is pending at server 121 and/or issuer server 122 and awaiting user identification at the identity verification point in order to validate the provisioning request.

Step 325 may optionally also include electronic device 113 sending a provisioning request message to server 121 and/or card issuer server 122. The provisioning request message can be sent by any communication channel that is available to electronic device 113, perhaps via antenna 117, such as a radio frequency transmission over a telecommunications network or a WiFi transmission to a router that is connected to a network such as the Internet. The provisioning request message includes a unique identifier suitable for identifying payment card 105, such as a Payment Account Reference ('PAR'), a PAN or tokenised PAN, or a sort-code and account number combination, but this is not essential to the invention and any other unique identifier that can be used to uniquely identify a payment card 105 may alternatively be used. The provisioning request message may additionally include information that uniquely identifies electronic device 113 such as an International Mobile Station Equipment Identity (IMEI) number, a mobile equipment identifier (MEID), a MAC address, or any other unique device identifier. The provisioning request message may be stored by server 121 and/or card issuer server 122 in a provisioning request message database.

As used herein, the term 'identity verification point' refers to a location at which one or more secure data entry devices like secure data entry device 107 are provided. Thus, the identity verification point can be a retailer's premises, a kiosk, a booth, an 'in bank branch' device, a data terminal, an ATM, etc. having at least one secure data entry device 107 available for use. Numerous suitable identity verification points will become apparent to a skilled person having the benefit of the present disclosure.

Following the request, in step 330 the user attends an identity verification point and indicates that they wish to use the identity verification functionality of secure data entry device 107. At this point, secure data entry device 107 is operated in the manner described above in connection with FIG. 2. It will be appreciated that significant time may elapse, e.g. a day or more, between steps 325 and 330.

In an alternative non-illustrated embodiment step 305 is omitted so that, after the provisioning process is initiated in step 300, the user is prompted to attend an identity verification point. Data relating to the user's payment instrument is automatically entered onto electronic device 113 when the user attends the identity verification point. Data transfer may be achieved in any manner known to the skilled person, such as using electronic device 113 to scan a Quick Response code or bar code that is displayed on secure data entry device 107 or printed on a receipt, or initiating Near Field Communication between secure data entry device 107 and electronic device 113. Advantageously, this avoids the user having to manually enter data relating to their payment instrument, saving time and also avoiding data entry errors. In this alternative embodiment, the optional provisioning request message described in the context of step 325 may be transmitted by electronic device 113 to server 121 and/or issuer server 122 following automatic entry of data relating to the user's payment instrument.

Referring to FIG. 4, the operation of server 121 and card issuer server 122 according to the first embodiment is described below.

In step 400, server 121 receives a request message that has been transmitted by secure data entry device 107 (see step 225 of FIG. 2). The request message is transmitted from secure data entry device 107 to server 121 via any available private or public network, e.g. the Internet. As discussed above, the request message contains all of the usual content that one skilled in the art would expect to find in a request message as known in the art. Optionally, the request message may contain an indication such as a flag that indicates that secure data entry device 107 is operating in identity validation mode.

Following this, in step 405, server 121 transmits the request message to card issuer server 122 and in step 410 card issuer server 122 validates the transaction in the manner well known in the art. It is important to note that, from the perspective of server card issuer server 122, the transaction is a normal transaction as known in the art.

Following validation, in step 415 card issuer server 122 transmits a response message to server 121, where the response message indicates whether the transaction has been approved, declined or referred in the case of voice authorization as discussed earlier in this specification in connection with step 235. This is also well known in the art. In the case that the transaction has been approved, the response message includes authorization data of any type discussed earlier in this specification. In the case that the transaction has been declined, the response message will omit the authorization data and/or will include some indication (e.g. a flag) to indicate that the transaction has been declined.

In step 420, server 121 transmits the response message that it received in step 415 on to secure data entry device 107. At this point, secure data entry device 107 determines whether the response message contains authorization data (FIG. 2, step 235) and, if yes, transmits the authorization data to electronic device 113 (FIG. 2, step 245). Electronic device 113 then transmits a message to card issuer server 122, where the message contains the authorization data it has received.

In step 425, card issuer server 122 analyses the message received from electronic device 113 to determine if it contains the authorization data that was transmitted to server 121 in step 415. In the event that the message received from electronic device 113 does contain this authorization data, card issuer server 122 may also optionally determine whether a provisioning request has been made in connection with payment card 105 via a provisioning request message (see step 325). This determination can be made by performing a lookup in a provisioning request message database, for example.

In the event the message received from electronic device 113 does contain the authorization data and optionally the provisioning request message was found in provisioning request message database then the method then moves to step 435 and card issuer server 122 transmits a provisioning approved message to electronic device 113. The provisioning approved message authorizing the provisioning of payment card 105 onto electronic device 113. The provisioning of this card takes place as described above in connection with step 260 of FIG. 2.

Step 425 can optionally include validating the location of secure data entry device 107, which information may have been included as part of step 405.

In the event that the message received from electronic device 113 does not contain the authorization data that was transmitted to server 121 in step 415, and/or a request to provision payment card 105 is not found, and/or, if determined, the location does not match, the method moves to step 440 and card issuer server 122 transmits a provisioning declined message to electronic device 113. The provisioning declined message declines the provisioning of payment card 105 onto electronic device 113, so that payment card 105 is not provisioned onto electronic device 113.

It will be appreciated that the determination of step 430 advantageously allows the present invention to determine, with good confidence, that: 1) a payment instrument and electronic device 113 were simultaneously physically present at an identity verification point; and 2) an authorized user was in control of both electronic device 113 and the payment instrument and hence in full control of the provisioning process. This allows the present invention to provision third path payment instruments with a good degree of confidence, reducing the opportunity for fraud.

Additionally, it will be appreciated that in all embodiments information relating to electronic device 113 (e.g. a device identifier) does not need to be supplied to secure data entry device 107. That is, electronic device 113 does not need to transmit data to secure data entry device 107; communication can be entirely one directional from the secure data entry device to the electronic device. This is because the various data processing devices involved in the identification process (i.e. electronic device 113, secure data entry device 107, server 121 and card issuer server 122) can tie together a single identification request as it passes through the various devices using information relating to payment card 105 such as a PAN, tokenised PAN, PAR, etc. This advantageously simplifies the identification process.

Step 430 can optionally make use of additional transaction data to perform a further validation beyond comparing the content of the message received from electronic device 113 with the authorization data that was transmitted to server 121.

In one embodiment the additional transaction data is the location of secure data entry device 107 and electronic device 113. In this embodiment, in step 245 (FIG. 2) electronic device 113 additionally transmits its location to server 121. The location of electronic device 113 can be determined using well known mechanisms, such as using GPS signals and/or using multilateration techniques on radio signals. The location of electronic device 113 is compared to the location of secure data entry device 107, which is either already known to server 121 or transmitted by secure data entry device 107 in step 225 (FIG. 2). Typically the location of secure data entry device 107 will be the address of the premises in which secure data entry device 107 is located.

If the location of electronic device 113 matches the location of secure data entry device 107 then the card issuing entity can be highly confident that electronic device 113 and payment card 105 were simultaneously present at the same location during the identity validation process shown in FIG. 2, which is an indicator of a genuine attempt to provision payment card 105 by an authorized user. Locations that do not match may be an indication that fraud is being attempted, i.e. an unauthorized user is attempting to provision payment card 105. In that case card provisioning may be declined even if the authorization data received from electronic device 113 is found to match the authorization data that was transmitted to secure data entry device 107.

In another embodiment, the optional additional transaction data comprises first and second time stamps. The first time stamp is generated by secure data entry device 107 at an appropriate point during the transaction, e.g. in step 225 when a request message is transmitted by secure data entry device 107. The second time stamp is generated by electronic device 113 at an appropriate time during the transaction, e.g. in step 250 when the electronic device transmits a message to card issuer server 122. Alternatively, server 121 may generate the first and second time stamps based on the time at which it receives the request message and the message from electronic device 113, respectively. Server 121 is configured to compare the first time stamp with the second time stamp to determine the time difference between these time stamps. Server 121 is further configured to compare the calculated time difference with a threshold value to determine whether the time difference exceeds the threshold value. In the event that the threshold value is exceeded, card provisioning may be declined even if the authorization data received from electronic device 113 is found to match the authorization data that was transmitted to secure data entry device 107. The threshold value is set at a value that is reasonably expected for the time between the request message and the receipt of authorization data from electronic device 113. For example, the threshold value may be in the range of thirty seconds to five minutes. The invention is however not limited in this respect and a skilled person having the benefit of the present disclosure will be able to determine an appropriate value for threshold value.

It will be appreciated that the time difference calculated by server 121 provides an indication of the time that has elapsed between a user entering their secure data into secure data entry device 107 and the receiving of authorization data by electronic device 113. It is expected that the time between these two actions will be relatively short, e.g. of the order of thirty seconds to five minutes. Thus, if the time difference between these two actions is greater than expected, e.g. five minutes or more, then this may be an indication that fraud is being attempted.

Further modifications to the principle of providing further validation will be apparent to a skilled person having the benefit of the present disclosure. It will also be appreciated that more than one further validation can be performed in a single transaction; e.g. both the location and the timestamp information may be compared in step 430.

It will be appreciated that the first embodiment and modifications thereof advantageously allows a payment instrument issuing entity to be confident that a provisioning request was initiated by an authorized user. This is because an unauthorized user should not have been able to enter the user's secure data into secure data entry device 107. In addition, the first embodiment and modifications thereof advantageously allows a payment instrument issuing entity to be confident that electronic device 113 and a payment instrument were in the possession of said authorized user when the user identity validation occurred.

Operation of the present invention according to a second embodiment is described below with reference to FIGS. 5, 6 and 7.

With reference to FIG. 5, the operation of secure data entry device 107 according to the second embodiment is described below. A number of aspects of the operation of secure data entry device 107 are the same in both the first and second embodiment, and to indicate this elements of FIG. 5 that are the same as elements of FIG. 2 have been given the same suffix. It will be appreciated that, when secure data entry device 107 operates according to FIG. 5, electronic device 113 operates according to FIG. 6 and server 121 and card issuer server 122 operate according to FIG. 7.

In step 500, mode select module 111 causes secure data entry device 107 to enter identity verification mode. Step 500 is the same as step 200 and so is not described in further detail here. In the case that secure data entry device 107 defaults to identity verification mode, or only offers identity verification mode because the normal transaction mode has been disabled, step 500 is omitted and the method begins at step 505.

In step 505, a transaction is initiated and the user is prompted to enter secure data into secure data entry device 107. Step 505 is the same as step 205 and so is not described in further detail here.

In step 510, the user enters their secure data into secure data entry device 107 using user input module 109. Step 510 is the same as step 210 and so is not described in further detail here.

In step 515, the secure data entered in step 505 is checked against the secure data on record for payment card 105. Step 515 is the same as step 215 and so is not described in further detail here. If the entered secure data does not match the secure data on record for payment card 105 then the method proceeds to step 520 where the transaction may be declined, or the user may be prompted to re-enter their secure data. If the entered secure data does match the secure data on record for payment card 105 then the method proceeds to step 525 where a request message is transmitted by secure data entry device 107 to server 121.

Steps 520 and 525 are the same as steps 220 and 225, respectively, and so are not described in further detail here. It is preferred that, in step 525, the request message includes an indication that secure data entry device 107 is operating in identity verification mode. The indication can be of the type discussed earlier in connection with step 225.

In step 530, secure data entry device 107 receives a response from server 121 referred to as an authorization response message. Step 530 is the same as step 230 and so is not described in further detail here.

In step 532, secure data entry device 107 receives an 'identification' message from server 121. The identification message indicates the success or failure of the identity validation process. It will be appreciated that provisioning of payment card 105 onto electronic device depends on the success or failure of the identity validation process; specifically, successful validation can result in payment card 105 being provisioned onto electronic device 113 and unsuccessful validation cannot result in payment card 105 being provisioned onto electronic device 113. In this embodiment the identification message simply contains a flag which takes a first value to indicate success and a second, different value to indicate failure. This is however not essential to the invention and the identification message can take any form that is capable of indicating success or failure of an event that is known to the skilled person.

In step 534, secure data entry device 107 indicates the success or failure of the identity validation process to the user. In this embodiment this indication takes the form of a message such as "Identification Successful" which is displayed on a display of secure data entry device 107. The invention is however not limited in this respect and any other mechanism for indicating the success or failure of the identity validation process that is known to a skilled person can alternatively be used. For example, a coloured light (e.g. an LED) can be used to indicate success or failure, with a first colour (e.g. green) indicating success and a second colour (e.g. red) indicating failure. Many modifications of this will be apparent to a skilled person having the benefit of the present disclosure.

It will be appreciated that step 534 advantageously makes a user aware of the status of the provisioning of payment card 105 onto electronic device 113. Additionally, successful provisioning is contingent on the correct secure data being entered into secure data entry device 107, meaning that an unauthorized user should not be able to provision payment card 105. Fraud is thus at least more difficult to perpetrate.

With reference to FIG. 6, the operation of electronic device 113 according to the second embodiment is the same as the operation of electronic device 113 in the first embodiment. To indicate this similarity, elements of FIG. 6 that are the same as elements of FIG. 3 have been given the same suffix.

Optionally, in the second embodiment, any of steps 605, 610 or 625 may additionally comprise electronic device 113 transmitting a unique identifier associated with the payment instrument that is being provisioned to card issuer server 122. In the case of payment card 105, the unique identifier is preferably a PAN, but other unique identifiers known to a skilled person may alternatively be used depending on the nature of the payment instrument. Card issuer server 122 may store this unique identifier in a database as discussed below in connection with step 710 of FIG. 7.

Alternatively, card issuer server 122 may independently maintain a list of unique identifiers of payment cards on the third path in a database, such that electronic device 113 does not need to transmit a unique identifier associated with payment card 105 to card issuer server 122. The issuer can determine which payment cards should be on the third path according to any suitable rules.

In either case, preferably the database is configured such that it can be queried by server 121 to allow server 121 to identify which path a specific payment card is on. A look-up server, which may be card issuer server 122 or it may be separate from card issuer server 122, may be provided to allow server 121 to query the database. Alternatively, card issuer server 122 may be configured to synchronise the database with another database that is accessible to server 121. Preferably the synchronisation occurs in real-time. The synchronisation may be provided by API calls, as known in the art. Various other modifications will be apparent to a skilled person having the benefit of the present disclosure.

Referring to FIG. 7, the operation of server 121 and card issuer server 122 according to the second embodiment is described below. In FIG. 7, unlike FIGS. 5 and 6, unless otherwise stated below the same suffixes do not indicate similar or identical operations as a corresponding step in FIG. 4.

In step 700, server 121 receives a request message that has been transmitted by secure data entry device 107 (see step 525 of FIG. 5). The request message is transmitted from secure data entry device 107 to server 121 via any available private or public network, e.g. the Internet. As discussed above, the request message contains all of the usual content that one skilled in the art would expect to find in a request message as known in the art. The request message preferably also includes an indication that secure data entry device 107 is operating in identity verification mode. This indication may be e.g. a flag that indicates that secure data entry device 107 is operating in identity verification mode. However, alternative indications known to the skilled person are also within the scope of the present invention.

In optional step 705, server 121 detects the indication that secure data entry device 107 is operating in identity verification mode by the presence of the indication discussed in the preceding paragraph. It will be appreciated that, if secure data entry device 107 is configured to provide the indication but the indication is not present, server 121 treats the transaction as a normal prior art transaction. In this case the method of FIG. 7 is not followed.

In optional step 710, server 121 determines whether a unique identifier corresponding to a payment instrument such as payment card 105 can be found in a database. The unique identifier can be any of a PAN, a Payment Account Reference ('PAR'), a tokenised PAN, or a sort-code and account number combination, but this is not essential to the invention and any other unique identifier that can be used to uniquely identify a payment instrument may alternatively be used. The database may be maintained by card issuer server 122 in the manner discussed earlier in this specification. In the event that a corresponding unique identifier cannot be found, the method moves to step 715 and the transaction is thereafter treated as a normal prior art transaction. If the transaction is specifically an "identification transaction" with the mode set as such, the transaction preferably stops at this point if a unique identifier could not be found.

In the event that a corresponding unique identifier can be found in the database, or in the event that optional step 710 is omitted, in step 720 server 121 transmits the request message to card issuer server 122 and in step 725 card issuer server 122 validates the transaction in the manner well known in the art. It is important to note that, from the perspective of card issuer server 122, this part of the transaction is a normal transaction as known in the art.

Following validation, in step 730 card issuer server 122 transmits a response message to server 121, where the response message indicates whether the transaction has been approved or declined. This is also well known in the art. Server 121 processes the response message and in step 735 server 121 generates a new 'identification' message, the content of which is based on the response message. It is important to recognise that the identification message is separate from the response message in the sense that a prior art transaction will not produce an identification message. The identification message indicates whether the identity validation succeeded or failed; specifically, if the response message indicates that card issuer server 122 authorized the transaction then identity validation is taken to have been successful, and if the response message indicates that card issuer server 122 did not authorize the transaction then identity validation is taken to have been unsuccessful. In this embodiment the identification message contains a flag, where server 121 is configured to set the flag to a first value that indicates success when the response message indicates that card issuer server 122 did authorize the transaction and to set the flag to a second, different value that indicates failure when the response message indicates that card issuer server 122 did not authorize the transaction. The invention is however not limited in this respect and any other mechanism for indicating success and failure of identity validation that is known to a skilled person can alternatively be used in identification message.

In step 740, server 121 transmits the identification message to card issuer server 122. Card issuer server 122 is configured to read the identification message and, in step 745, determine whether identity verification was successful. In this embodiment this involves determining the value of a flag contained in the identity verification message, but the invention is not limited in this respect and alternatives known to the skilled person can be used instead.

In the event that identity verification was successful then the method moves to step 750 and the provisioning of payment card 105 onto electronic device 113 is authorized. This authorization subsequently causes payment card 105 to be provisioned onto electronic device 113.

In the event that identity verification was unsuccessful then the method moves to step 755 and the provisioning of payment card 105 onto electronic device 113 is declined. This prevents payment card 105 from being provisioned onto electronic device 113.

Regardless of whether provisioning was declined or authorized, in step 760 server 121 transmits the outcome of the identification process to secure data entry device 107. In this embodiment this comprises forwarding the identification message generated in step 735 to secure data entry device 107. Modifications of this are possible; for example, in an alternative embodiment server 121 generates another new message and transmits this to secure data entry device 107. The invention is not limited in this respect and further modifications will become apparent to a skilled person having the benefit of the present disclosure. As discussed above in connection with step 534 of FIG. 5, secure data entry device 107 is configured to indicate the success or failure of the identity validation process to the user. In the event that the identity validation process is successful, the method proceeds to step 765 in which card issuer server 122 transmits an approval of the provisioning of payment instrument 105 to electronic device 113. In this way payment instrument 105 is provisioned onto electronic device 113.

It will be appreciated that the second embodiment advantageously allows a payment instrument issuing entity to be confident that a provisioning request was initiated by an authorized user. This is because an unauthorized user should not have been able to supply the user's secure data into secure data entry device 107. This results in failure of the identity validation process, and ultimately prevents provisioning of the payment instrument onto electronic device 113.

FIG. 8 shows a sequence diagram of the overall system in operation according to the first embodiment. Specifically, the sequence diagram shows the information flow under the situation where a user correctly enters their secure data and provisioning is authorized. The numbers present in FIG. 8 correspond to the respective steps of FIGS. 2 and 4, and hence description of the steps shown in FIG. 8 is not repeated here. It will be appreciated that arrow 435 would be replaced with arrow 440 in FIG. 8 in the situation under which provisioning is declined by card issuer server 122.

FIG. 9 shows a sequence diagram of the overall system in operation according to the second embodiment. Specifically, the sequence diagram shows the information flow under the situation where a user correctly enters their secure data. The numbers present in FIG. 9 correspond to the respective steps of FIGS. 5 and 7, and hence description of the steps shown in FIG. 9 is not repeated here.

Numerous modifications, adaptations and variations to the embodiments described herein will become apparent to a person skilled in the art having the benefit of the present disclosure, and such modifications, adaptations and variations that result in additional embodiments of the present invention are also within the scope of the accompanying claims.

The invention claimed is:

1. A method of authenticating a request to provision a payment instrument onto an electronic device, comprising:
    determining whether the electronic device is initiating a provisioning process, the provisioning process involving the payment instrument;
    receiving secure data from a secure data entry device, the secure data being associated with the payment instrument;
    determining whether the received secure data matches secure data stored on a record associated with the payment instrument;
    transmitting a request message from the secure data entry device to a server;
    validating the request message from the secure data entry device at the server;
    generating a response message based on the validation;
    including authorization data to the response message based on the validation being successful;
    transmitting the response message to the secure data entry device;
    transmitting data including the authorization data to the electronic device, wherein the authorization data is transmitted to the electronic device either by the electronic device receiving a transmission from the secure data entry device or by the electronic device reading a barcode or Quick Response code generated by the secure data entry device;
    transmitting the data including the authorization data from the electronic device to the server without transmission through the secure data entry device;
    determining, at the server, whether the data including the authorization data transmitted from the electronic device includes the authorization data that was initially included in the response message transmitted to the secure data entry device;
    transmitting approval for the request to provision the payment instrument to the electronic device; and
    provisioning the payment instrument onto the electronic device.

2. The method of claim 1, the method further comprising:
    transmitting a provisioning request message from the electronic device to the server, the provisioning request message including a unique identifier associated with the payment instrument,
    wherein the provisioning request message further includes a unique identifier associated with the electronic device.

3. The method of claim 1, wherein the method further comprises:
    determining whether a provisioning request has been made in connection with the payment instrument.

4. The method of claim 1, wherein the transmission of the data including the authorization data to the electronic device comprises:
    a Near Field Communication transmission;
    a Wi-Fi transmission;
    a Bluetooth transmission;
    an acoustic signal;
    a series of light pulses; or
    a series of vibrational pulses.

5. The method of claim 1, wherein the electronic device is any one of: a portable electronic device, a mobile telephone, a tablet, a games console, a smart television, a wearable electronic device, a watch, a beacon and a payment card alternative.

6. The method of claim 1, wherein the secure data includes one or more of: a Personal Identification Number, biometric data and magnetic stripe data.

7. The method of claim 1, further comprising:
    receiving data indicative of a location of the secure data entry device; and
    receiving data indicative of a location of the electronic device;
    wherein the determining whether the data including the authorization data transmitted from the electronic device includes the authorization data that was initially included in the response message transmitted to the secure data entry device further comprises determining whether the location of the secure data entry device corresponds to the location of the electronic device.

8. The method of claim 1, wherein the secure data entry device is an Automated Teller Machine comprising a communication module that is configured for one-way communication with the electronic device, wherein the communication module comprises one of:
    a Near Field Communication (NFC) antenna;
    a Bluetooth transmitter;
    an acoustic transmitter;
    a light emitting device;
    a magnetic field generating device;
    a motor; and
    a chamber that is configured such that it can be pressurised and depressurised whilst the electronic device is within it.

9. A system for authenticating a request to provision a payment instrument, the system comprising:
an electronic device;
a secure data entry device; and
a server;
wherein the secure data entry device is configured to: receive secure data that is associated with the payment instrument, determine whether the received secure data matches secure data stored on a record associated with the payment instrument and, in the affirmative transmit a request message to the server;
wherein the server is configured to: receive the request message, validate the request message and transmit a response message to the secure data entry device, wherein the response message indicates success or failure of the validation; and
wherein, in the event the validation was successful, the response message includes authorization data;
wherein the electronic device is configured to: initiate a provisioning process thereon, the provisioning process involving the payment instrument; receive data including the authorization data either by receiving a transmission from the secure data entry device or by reading a barcode or Quick Response code generated by the secure data entry device; and transmit the received data to the server without transmission through the secure data entry device;
wherein the server is further configured to: determine whether the received data transmitted from the electronic device includes the authorization data that was initially included in the response message sent to the secure data entry device; and, in the affirmative, transmit approval for the request to provision the payment instrument to the electronic device; and
wherein the payment instrument is provisioned onto the electronic device in response to the approval.

10. The system of claim 9, wherein the electronic device is further configured to transmit a provisioning request message to the server, the provisioning request message including a unique identifier associated with the payment instrument.

11. The system of claim 10, wherein the provisioning request message includes a unique identifier associated with the electronic device.

12. The system of claim 9, wherein the secure data entry device is one of: a PIN Entry Device; an Automated Teller Machine; an Unattended Payment Terminal, a Semi attended Cardholder Activated Payment Terminal; and an Automated Fuel Dispenser.

13. The system of claim 9, wherein the secure data entry device is configured to switch between a first operating mode and second operating mode, wherein one of the first operating mode and the second operating mode facilitates identification of a user.

14. A method of authenticating a request to provision a payment instrument onto an electronic device, comprising:
receiving secure data from a secure data entry device, the secure data being associated with the payment instrument;
determining whether the received secure data matches secure data stored on a record associated with the payment instrument;
transmitting a request message from the secure data entry device to a server;
transmitting a response from the server to the secure data entry device;
determining whether the response from the server contains authorization data indicating authorization of a transaction;
transmitting the authorization data to the electronic device, wherein the authorization data is transmitted to the electronic device either by receiving a transmission from the secure data entry device or by reading a barcode or Quick Response code generated by the secure data entry device;
transmitting the authorization data from the electronic device to the server without transmission through the secure data entry device;
transmitting approval for the request to provision the payment instrument onto the electronic device at the electronic device from the server in response to the server determining that the authorization data transmitted from the electronic device matches the authorization data that was initially included in the response transmitted to the secure data entry device; and
provisioning the payment instrument onto the electronic device in response to the approval.

15. The method of claim 14, wherein the method further comprises:
transmitting data indicative of a location of the secure data entry device to the server; and
transmitting data indicative of a location of the electronic device to the server.

16. A system for authenticating a request to provision a payment instrument onto an electronic device, comprising:
a secure data entry device configured to:
receive secure data associated with the payment instrument;
determine whether the received secure data matches secure data stored on a record associated with the payment instrument and, in the affirmative, transmit a request message to a server, receive a response from the server and determine whether the received response contains authorization data indicating authorization of a transaction;
wherein the electronic device is configured to receive the authorization data and to transmit the authorization data to the server without transmission through the secure data entry device, wherein the authorization data is received either by receiving a transmission from the secure data entry device or by reading a barcode or Quick Response code generated by the secure data entry device;
wherein the electronic device is further configured to receive approval for the request to provision the payment instrument onto the electronic device from the server in response to the server determining that the authorization data transmitted from the electronic device matches the authorization data that was initially included in the response sent to the secure data entry device; and
wherein the payment instrument is provisioned onto the electronic device in response to the approval.

17. The system of claim 16, wherein the electronic device is configured to:
receive a Near Field Communication transmission, the Near Field Communication transmission including the authorization data; and/or
receive a Wi-Fi transmission, the Wi-Fi transmission including the authorization data; and/or
receive a Bluetooth transmission, preferably a Bluetooth Low Energy transmission, the Bluetooth transmission including the authorization data; and/or receive an acoustic signal, the acoustic signal including the authorization data; and/or receive a series of light pulses, the series of light pulses encoding the authorization data; and/or receive a series of vibrational pulses, the series of vibrational pulses encoding the authorization data.

18. The system of claim 16, wherein the electronic device is any one of: a portable electronic device, a mobile telephone, a tablet, a games console, a smart television, a wearable electronic device, a watch, a beacon and a payment card alternative.

19. The system of claim 16, wherein the payment instrument is a payment card.

\* \* \* \* \*

UNITED STATES PATENT AND TRADEMARK OFFICE
CERTIFICATE OF CORRECTION

PATENT NO. : 11,023,893 B2
APPLICATION NO. : 15/735160
DATED : June 1, 2021
INVENTOR(S) : Johnathan Vokes et al.

Page 1 of 1

It is certified that error appears in the above-identified patent and that said Letters Patent is hereby corrected as shown below:

On the Title Page

Column 2 (Line 16 of Abstract), before "based", delete "select module."

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*